US010885875B2

(12) United States Patent
Lin et al.

(10) Patent No.: US 10,885,875 B2
(45) Date of Patent: Jan. 5, 2021

(54) SEAMLESS OR FRAMELESS DISPLAY DEVICE HAVING LENS LAYER

(71) Applicant: AU OPTRONICS CORPORATION, Hsin-Chu (TW)

(72) Inventors: Wen-Tsan Lin, Hsin-Chu (TW); Cheng-Han Tsao, Taichung (TW); Wen-Lung Chen, Taichung (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/367,346

(22) Filed: Mar. 28, 2019

(65) Prior Publication Data
US 2019/0304404 A1    Oct. 3, 2019

(30) Foreign Application Priority Data

Mar. 29, 2018 (TW) .............................. 107111037 A

(51) Int. Cl.
*G09G 3/10* (2006.01)
*G09G 5/10* (2006.01)
*G02B 3/00* (2006.01)

(52) U.S. Cl.
CPC ............... *G09G 5/10* (2013.01); *G02B 3/005* (2013.01); *G09G 2300/026* (2013.01); *G09G 2320/0686* (2013.01)

(58) Field of Classification Search
CPC ............. G02B 3/005; G09G 2300/026; G09G 2320/0686; G09G 5/10
See application file for complete search history.

(56) References Cited

U.S. PATENT DOCUMENTS

| 8,310,622 B2 | 11/2012 | Ha et al. |
| 9,593,824 B2 | 3/2017 | Niu et al. |
| 9,818,335 B2 | 11/2017 | Wu |
| 10,067,369 B2 | 9/2018 | Liu et al. |
| 2012/0268349 A1 | 10/2012 | Hayashi et al. |

(Continued)

FOREIGN PATENT DOCUMENTS

| CN | 101477223 A | 7/2009 |
| CN | 102207567 A | 10/2011 |

(Continued)

OTHER PUBLICATIONS

An office action from the CNIPA dated Dec. 24, 2019.
Office action from the TIPO dated May 9, 2019.

*Primary Examiner* — Chun-Nan Lin
(74) *Attorney, Agent, or Firm* — WPAT, PC

(57) ABSTRACT

The present invention provides a display device including a first display panel and a lens layer. The first display panel is provided with a first display area and a first frame located at a side of the first display area. The first display area includes a plurality of first pixels, and some of the first pixels form a first image adjustment area adjacent to the first frame. When the first image adjustment area receives a same first image source signal provided to the first display panel, brightness generated by the first pixels in the first image adjustment area is greater than that of the other first pixels in the first display area. The lens layer covers the first image adjustment area and the first frame and includes a plurality of lenses arranged side by side and respectively extending in an extending direction of the first frame.

12 Claims, 19 Drawing Sheets

(56) References Cited

U.S. PATENT DOCUMENTS

2013/0250408 A1 9/2013 Wu et al.
2013/0343081 A1* 12/2013 Niu .................... G02F 1/13336
              362/606
2019/0102597 A1* 4/2019 Lu ........................ G06K 9/0004

FOREIGN PATENT DOCUMENTS

| | | |
|---|---|---|
| CN | 102568334 A | 7/2012 |
| CN | 102707448 A | 10/2012 |
| CN | 102750878 A | 10/2012 |
| CN | 104517535 A | 4/2015 |
| CN | 204302632 U | 4/2015 |
| JP | 3762123 B2 | 4/2006 |
| TW | 201513074 A | 4/2015 |
| TW | I534503 B | 5/2016 |
| TW | I578291 B | 4/2017 |

* cited by examiner

SEAMLESS OR FRAMELESS DISPLAY DEVICE HAVING LENS LAYER

BACKGROUND

Technical Field

The present invention relates to a display device. Specifically, the present invention relates to a display device having improved display quality at edges of a display panel or boundaries between assembled display panels.

Related Art

In recent years, large-size display devices implemented by assembling a plurality of display panels have gradually been used in various fields such as public information displays (PID), and the technical development of the large-size display devices also attracts more attention. However, in such large-size display device, a boundary edge between adjacent display panels may be easily observed by a viewer, and consistency and coordination of an image displayed on the assembled display panels is apt to be deteriorated by the boundary edge, resulting in reduction in the display quality of the entire display device.

In view of the above, some components are developed to cover the boundary edge, so as to eliminate the obtrusive appearance generated by the boundary edge. However, by such technology, display brightness, color, or the like of a corresponding area at the boundary edge on which the component covers might be changed or degraded, resulting in reduction in the whole display effect. In addition, the effect of blurring of the boundary edge by such the component is limited, and a black edge or black line may still be easily observed by a viewer. Therefore, to improve the display quality of the large-size display device and watching experience of the user using the large-size display device, a display technology and a display device capable of improving an effect of image display at a boundary edge while reducing visual obviousness of a frame or a gap at the boundary edge is needed.

SUMMARY

To resolve the foregoing problem, an embodiment of the present invention provides a display device including a first display panel and a lens layer. The first display panel is provided with a first display area and a first frame located at a side of the first display area. The first display area includes a plurality of first pixels, and some of the first pixels form a first image adjustment area adjacent to the first frame. When the first image adjustment area receives a same first image source signal provided to the first display panel, brightness generated by the first pixels in the first image adjustment area is greater than that of the other first pixels in the first display area. The lens layer covers the first image adjustment area and the first frame and includes a plurality of lenses arranged side by side and respectively extending in an extending direction of the first frame.

In the display device provided in the embodiments of the present invention, a lens layer may be used to receive and guide light to a position on a frame or boundary edge, so as to eliminate or reduce visual obviousness of the obtrusive appearance and cutting appearance of a black edge or black line at the frame or boundary edge. Further, in the display device provided in the embodiments of the present invention, the brightness and color of the light guided by the lens layer may be enhanced or improved by receiving the adjusted light of the first image adjustment area, thereby enabling image display at the frame or boundary edge to be more consistent and integrated relative to the entire display device.

DETAILED DESCRIPTION

The following describes various embodiments and persons of ordinary skill in the art may readily understand the spirit and principle of the present invention with reference to the descriptions in combination with the accompanying drawings. However, although some specific embodiments are specifically described in the text, the embodiments are merely exemplary and are not considered to have limitative or exhaustive meanings in all aspects. Therefore, all variants and modifications made to the present invention without departing from the spirit and principles of the present invention should be apparent and readily to be achieved for persons of ordinary skill in the art.

Figure 1A:
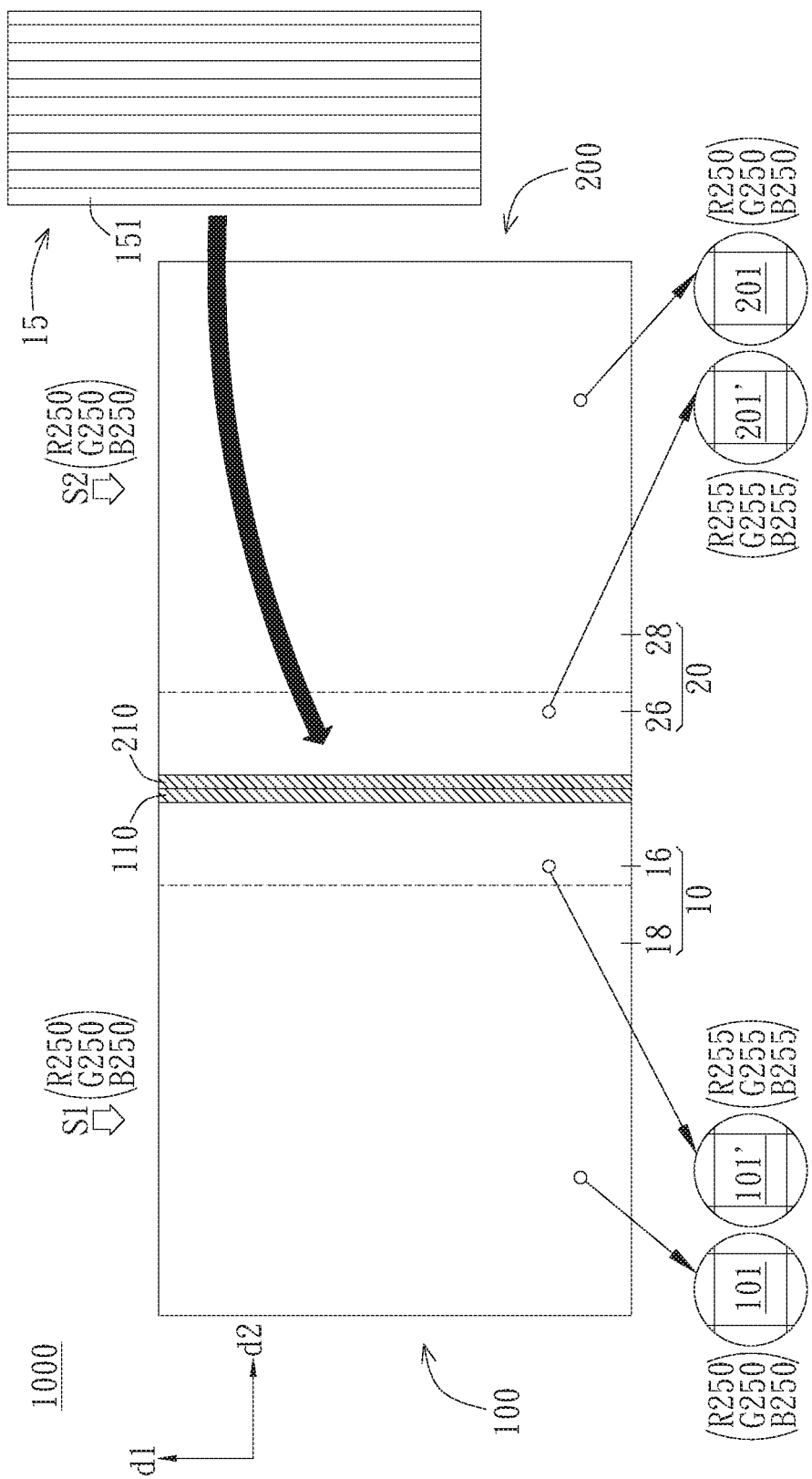
FIG. 1A and FIG. 1B are schematic diagrams of a display device according to an embodiment of the present invention.
Figure 1B:
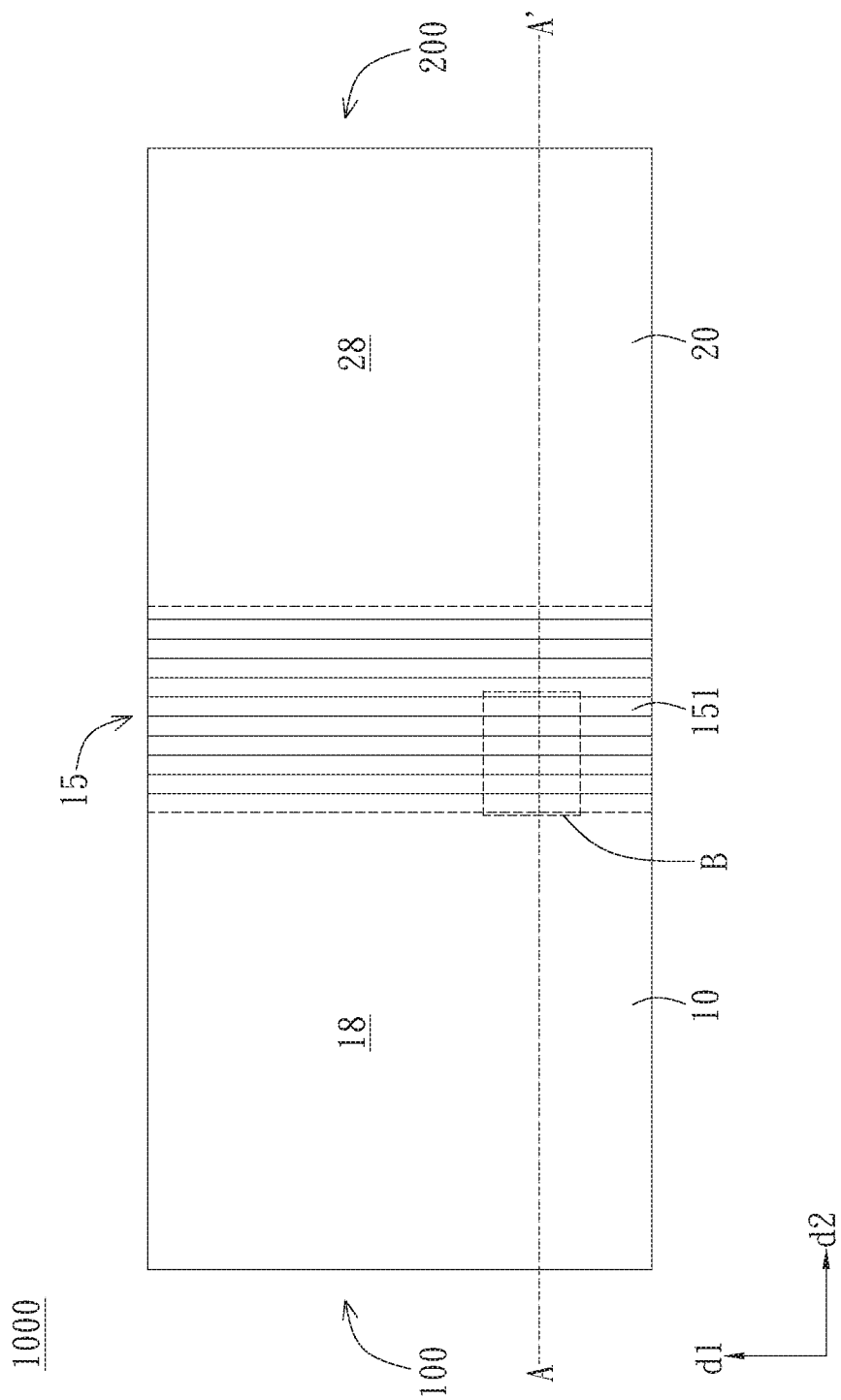

The following describes a display device according to an embodiment of the present invention with reference to FIG. 1A and FIG. 1B.

First, referring to FIG. 1A and FIG. 1B, a display device 1000 may include two display panels 100 and 200, and the first display panel 100 and the second display panel 200 are assembled at one sides, to enable the display device 1000 to display an image of a larger size. In detail, the first display panel 100 is provided with a first display area 10 and a first frame 110 located at a side of the first display area 10. Similarly, the second display panel 200 is provided with a second display area 20 and a second frame 210 located at a side of the second display area 20. The second frame 210 and the first frame 110 are arranged adjacent to each other side by side. The first frame 110 and the second frame 210 may essentially be edge blocks not including a display pixel at the sides where the first display panel 100 and the second display panel 200 are assembled, or may essentially be a part of a gap generated when the first display panel 100 and the second display panel 200 are assembled. In other words, the first frame 110 and the second frame 210 may be, for example, a part of an entity component, a non-display area generated while assembling, or a combination thereof.

Further, the first display area 10 of the first display panel 100 may include a plurality of first pixels 101 and 101' for emitting light and displaying. For example, the first pixels 101 and 101' may be pixels respectively emitting red, green, and blue light, and the first display area 10 may display an expected color and image by a light-emitting combination of different first pixels 101 and 101'. The first pixels 101' of the first display area 10 form a first image adjustment area 16 adjacent to the first frame 110, and the other first pixels 101 form a first image default area 18 adjacent to the first image adjustment area 16.

Similarly, the second display area 20 of the second display panel 200 may include a plurality of second pixels 201 and 201' for emitting light and displaying. For example, the second pixels 201 and 201' may be pixels respectively emitting red, green, and blue light, and the second display area 20 may display an expected color and image by a light-emitting combination of different second pixels 201 and 201'. The second pixels 201' of the second display area 20 form a second image adjustment area 26 adjacent to the second frame 210, and the other second pixels 201 form a second image default area 28 adjacent to the second image adjustment area 26.

Referring to FIG. 1A and FIG. 1B, further, the display device 1000 may include a lens layer 15 covering the first image adjustment area 16 and the first frame 110 and covering the second image adjustment area 26 and the second frame 210. In addition, according to an embodiment of the present invention, the lens layer 15 may also cover a range beyond the first image adjustment area 16 and the first frame 110, and beyond the second image adjustment area 26 and the second frame 210, and the present invention is not limited to the examples shown herein. As shown in FIG. 1A and FIG. 1B, the lens layer 15 includes a plurality of lenses 151 arranged side by side. For example, the lenses 151 may be elongated lenses 151 extending linearly, and the elongated lenses 151 respectively extend along an extending direction d1 of the first frame 110 and the second frame 210. For example, according to some embodiments of the present invention, the elongated lenses 151 may be parallel to the first frame 110 and/or the second frame 210.

The sizes and number of the lenses 151 shown in FIG. 1A and FIG. 1B herein are drawn merely for clear illustration, and the sizes and number do not represent actual sizes and number of the lenses 151 in the lens layer 15. In addition, similarly, ratios and relative ratios of all components shown in all the figures of the present application may be enlarged or changed for clarity, and do not represent actual ratios and relative ratios of the components.

Therefore, the lens layer 15 disposed on the first image adjustment area 16 and the first frame 110 and on the second image adjustment area 26 and the second frame 210 may guide light emitted from at least a part of the first display area 10 and/or the second display area 20 to a position over the first frame 110 and/or the second frame 210. For example, light emitted from the first image adjustment area 16 and the second image adjustment area 26 is guided to a position over the first frame 110 and/or the second frame 210 by the lenses 151, so as to obscure or shield at least a part of the first frame 110 and the second frame 210, and to enable the first frame 110 and the second frame 210 to present an expected display image and effect, thereby increasing integrity of the image.

In addition, to compensate for incapability of displaying and emitting light, weak light emitting, or errors in display effect over the first frame 110 and the second frame 210, the first image adjustment area 16 and the second image adjustment area 26 beneath the lens layer 15 may be adjusted to emit strong light or adjusted light, so as to compensate for the display defects over the first frame 110 and the second frame 210 by the adjusted light emitted from the first image adjustment area 16 and the second image adjustment area 26.

For example, when a first image source signal S1 indicating images of a same brightness is sent to the first display area 10 of the first display panel 100, for the same first image source signal S1 provided to the first display panel 100, brightness generated by the first pixels 101' in the first image adjustment area 16 of the first display area 10 is greater than that generated by the other first pixels 101 in the first image default area 18 of the first display area 10. In detail, when the first image source signal S1 is input to the display device 1000, a drive circuit (not shown) in the first display panel 100 may perform adjustment based on the first image source signal S1 to send different display signals respectively to the first image adjustment area 16 and the first image default area 18, such that the display signal entering the first image adjustment area 16 for essentially controlling the first pixels 101' and the display signal entering the first image default area 18 for essentially controlling the first pixels 101 are different relative to the same first image source signal S1 provided to the first display panel 100. In this way, for the same first image source signal S1 provided to the first display panel 100, the brightness generated by the first pixels 101' in the first image adjustment area 16 of the first display area 10 may be set to be greater than that generated by the other first pixels 101 in the first image default area 18 of the first display area 10.

For example, when the first image source signal S1 indicates displaying red (R) in grayscale of 250, green (G) in grayscale of 250, and blue (B) in grayscale of 250, the brightness of the first pixels 101 in the first image default area 18 may be red (R) in grayscale of 250, green (G) in grayscale of 250, and blue (B) in grayscale of 250 as preset; and the brightness generated by the first pixels 101' in the first image adjustment area 16 of the first display area 10 may be enhanced to be red (R) in grayscale of 255, green (G) in grayscale of 255, and blue (B) in grayscale of 255.

Likewise, when a second image source signal S2 indicating images of a same brightness is sent to the second display area 20 of the second display panel 200, for the same second image source signal S2 provided to the second display panel 200, brightness generated by the second pixels 201' in the second image adjustment area 26 of the second display area 20 is greater than that generated by the other second pixels 201 in the second image default area 28 of the second display area 20. In detail, when the second image source signal S2 is input to the display device 1000, a drive circuit (not shown) in the second display panel 200 may perform adjustment based on the second image source signal S2 to send different display signals respectively to the second image adjustment area 26 and the second image default area 28, such that the display signal entering the second image adjustment area 26 for essentially controlling the second pixels 201' and the display signal entering the second image default area 28 for essentially controlling the second pixels 201 are different relative to the same second image source signal S2 provided to the second display panel 200. In this way, for the same second image source signal S2 provided to the second display panel 200, the brightness generated by the second pixels 201' in the second image adjustment area 26 of the second display area 20 may be set to be greater than that generated by the other second pixels 201 in the second image default area 28 of the second display area 20.

For example, when the second image source signal S2 indicates displaying red (R) in grayscale of 250, green (G) in grayscale of 250, and blue (B) in grayscale of 250, the brightness of the second pixels 201 in the second image default area 28 may be red (R) in grayscale of 250, green (G) in grayscale of 250, and blue (B) in grayscale of 250 as preset; and the brightness generated by the second pixels 201' in the second image adjustment area 26 of the second display area 20 may be enhanced to be red (R) in grayscale of 255, green (G) in grayscale of 255, and blue (B) in grayscale of 255. However, the foregoing are merely exemplary, and implementations of image adjustment of the first image adjustment area 16 and the second image adjustment area 26 are not limited herein. For example, in some embodiments, to compensate for light of a specific color that may be weakened (for example, absorbed by the lens 151) when emitting through the lens 151, light of different colors of the first image adjustment area 16 and the second image adjustment area 26 may also be adjusted based on different extents. For example, when the first image default area 18 and/or the second image default area 28 displays red (R) in grayscale of 245, green (G) in grayscale of 245, and blue (B) in grayscale of 245, the brightness of the first image adjustment area 16 and/or the second image adjustment area 26 may be adjusted to be red (R) in grayscale of 250, green (G) in grayscale of 250, and blue (B) in grayscale of 255, or the like, and the present invention is not limited herein.

The display device 1000 may include only one display panel or may be formed by assembling two or more display panels, and descriptions with respect to the first frame and/or the second frame stated above may be applicable to examples of one display panel or a plurality of display panels and do not go beyond the scope of the present invention. For example, when there is only one display panel, for example, the first display panel 100, the lens layer 15 may cover the first image adjustment area 16 and the first frame 110. In this case, for the same first image source signal S1 provided to the first display panel 100, the brightness generated by the first pixels 101' in the first image adjustment area 16 of the first display area 10 is greater than that generated by the first pixels 101 in the first image default area 18 of the first display area 10, and adjusted light of the first image adjustment area 16 may be guided to a position over the first frame 110 for emission, so as to blur the first frame 110 and improve the display quality over the first frame 110, thereby producing a frameless or narrow frame display effect.

Figure 2:
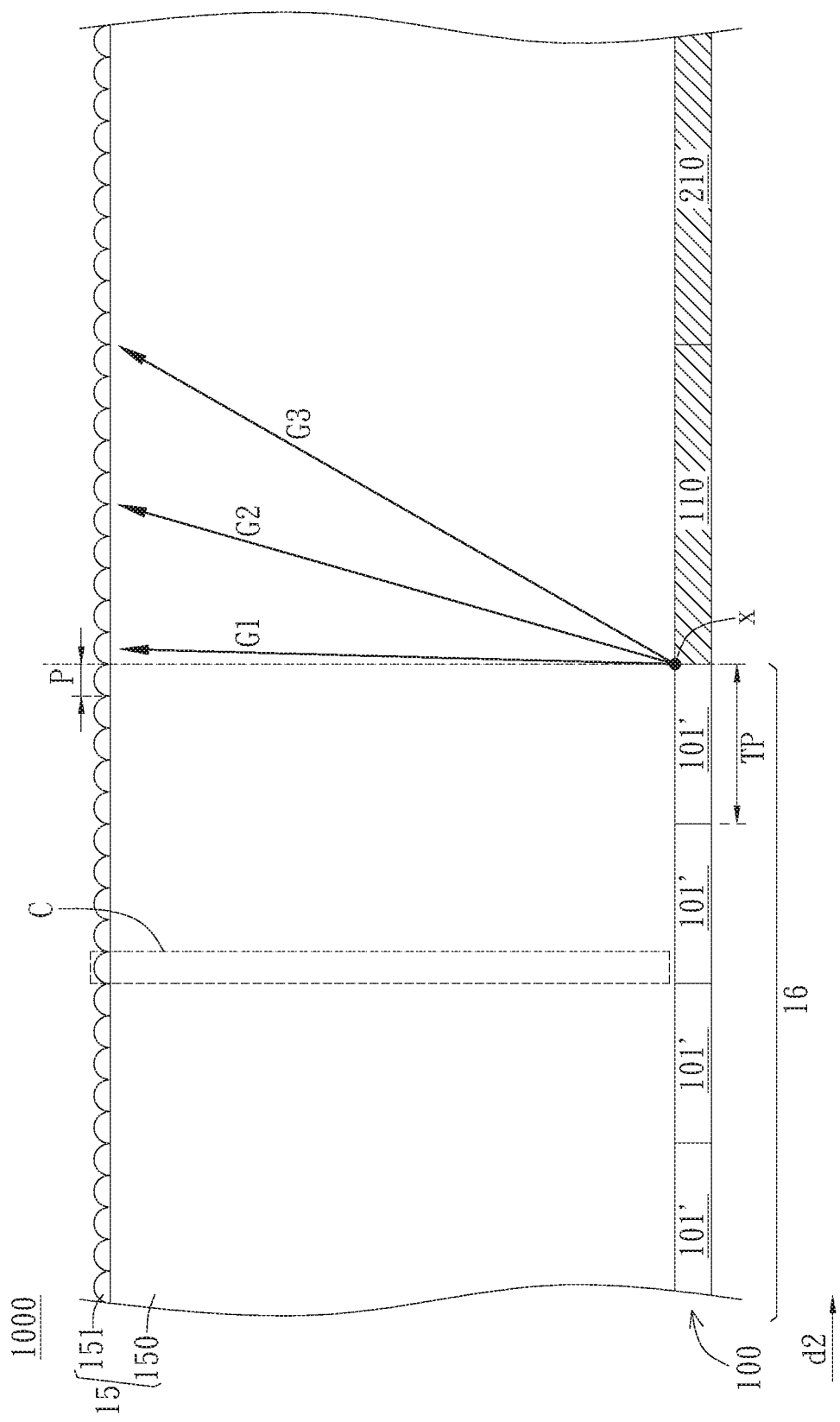
FIG. 2 is a cross-sectional diagram of the display device taken along a line A-A' in FIG. 1B according to an embodiment of the present invention.

The following further describes the implementation in which the lens layer 15 covers the display panel according to this embodiment of the present invention with reference to FIG. 2, the cross-sectional diagram of the display device 1000 taken along the line A-A' in FIG. 1B. For brevity, FIG. 2 only shows a cross-sectional diagram of a part B in FIG. 1B.

Referring to FIG. 2, the lens layer 15 may include at least one substrate 150 and lenses 151 disposed on the at least one substrate 150. According to this embodiment of the present invention, the lenses 151 on the first frame 110 and the second frame 210 may receive light emitted from the first image adjustment area 16 and/or the second image adjustment area 26 (not shown in FIG. 2; the optical effect of the second image adjustment area 26 is substantially corresponding to that of the first image adjustment area 16) and emit the light on the first frame 110 and the second frame 210, so as to enable the first frame 110 and the second frame 210 to display and emit light, thereby further eliminating or reducing visual obviousness of the first frame 110 and the second frame 210.

For example, as shown in FIG. 2, light G1, G2, G3 emitted from a position X (that is, a position adjacent to the first frame 110) of the first image adjustment area 16 may be incident on the lens layer 15 at different incident angles, and be transmitted through the at least one substrate 150 to the lenses 151 at different positions on the first frame 110 to emit. The light emitted from the lenses 151 looks like being emitted from the first frame 110 for a viewer, and therefore visual obviousness of the first frame 110 can be eliminated or reduced. In addition, although it is not specifically shown herein, operations of emission from the first image adjustment area 16 to the lenses 151 on the second frame 210, emission from the second image adjustment area 26 to the lenses 151 on the first frame 110, and emission from the second image adjustment area 26 to the lenses 151 on the second frame 210 are similar to the operation of emission from the first image adjustment area 16 to the lenses 151 on the first frame 110. In addition, with reference to FIG. 1A and FIG. 1B, the display effect over the first frame 110 and the second frame 210 may be further improved by adjusting elements such as the brightness and color of the light emitted by the first image adjustment area 16 and/or the second image adjustment area 26, and details are not described herein.

To enable the lenses 151 on the first frame 110 and the second frame 210 to guide light from at least a part of the first display area 10 and the second display area 20 (for example, the first image adjustment area 16 and/or the second image adjustment area 26) other than the first frame 110 and the second frame 210 to emit, a number of layers forming the substrate 150, materials and sizes of the substrate 150 and the lenses 151, a curvature of the lenses 151, and a ratio and relative ratio of the lenses 151, the pixels (for example, the first pixel and the second pixel), the first frame 110, and the second frame 210 all may be adjusted and designed accordingly. Accordingly, expected light can be refracted and transmitted through the substrate 150 and the lenses 151, so as to emit from a position over the first frame 110 and the second frame 210, and the specific descriptions and examples are further described below.

For example, in a direction d2 perpendicular to the extending direction d1 of the first frame 110, the lenses 151 each have a lens width P, and the first pixels 101 and 101' each have a first pixel width TP. According to an embodiment of the present invention, the lens width P may be preferably less than the first pixel width TP. For example, the lens width P may be not greater than ⅕ of the first pixel width TP. Alternatively, the lens width P may range from ⅕ to ⅙ of the first pixel width TP. In addition, according to some embodiments of the present invention, the widths of the first frame 110 and the second frame 210 may respectively be twice the first pixel width TP. That is, a sum of widths of the first frame 110 and the second frame 210 in the direction d2 perpendicular to the extending direction d1 of the first frame 110 may be approximately quadruple of the first pixel width TP. Further, according to an embodiment of the present invention, the sum of widths of the first frame 110 and the second frame 210 in the direction d2 perpendicular to the extending direction d1 of the first frame 110 does not exceed 3 mm. However, the foregoing descriptions are merely exemplary, and the present invention is not limited herein.

Subsequently, referring to FIG. 3 of the schematic enlarged diagram of the part C in FIG. 2, examples of a thickness, material, and corresponding refractive index of the substrate 150 according to an embodiment of the present invention will be described.

Figure 3:
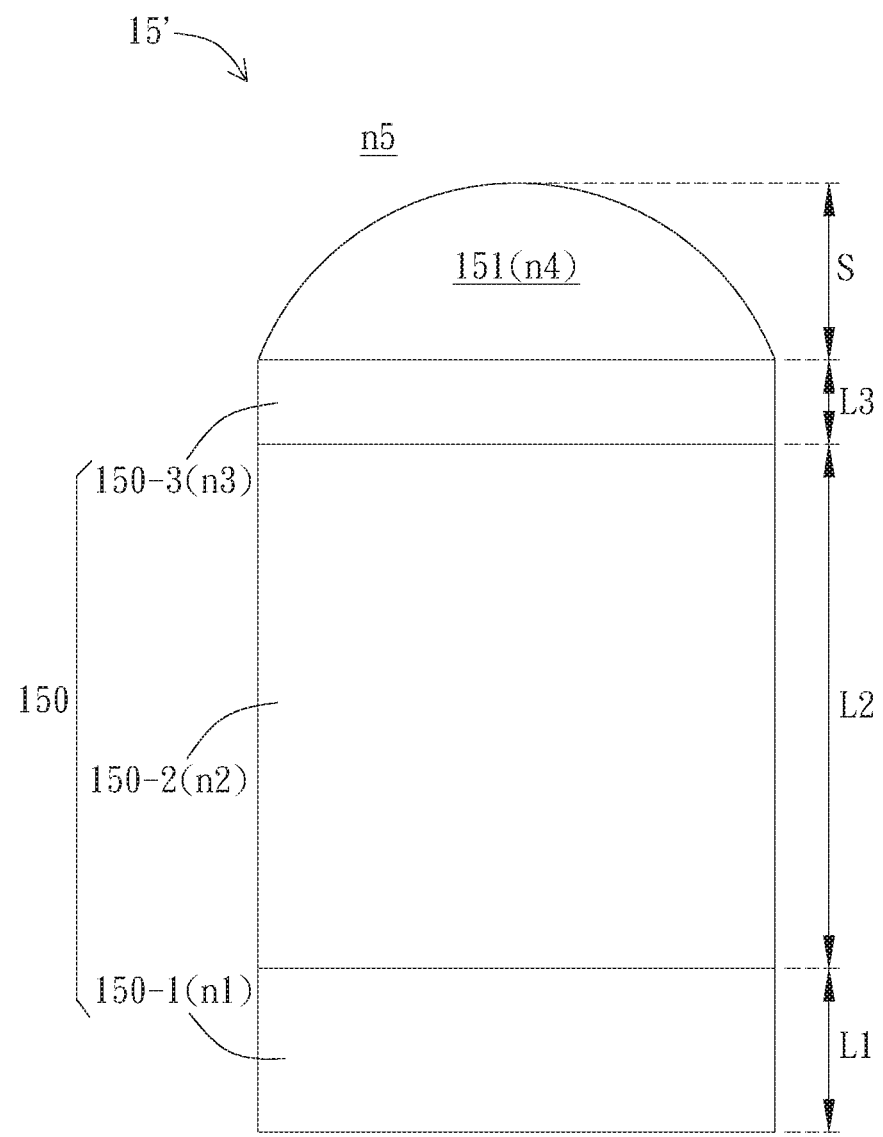
FIG. 3 is a schematic enlarged diagram of a part C in FIG. 2 according to an embodiment of the present invention.

Referring to FIG. 3, according to an embodiment of the present invention, the lens layer 15' may include a lens 151 and a substrate 150, and the substrate 150 may include a first layer 150-1, a second layer 150-2, and a third layer 150-3. The first layer 150-1 may have a refractive index n1, the second layer 150-2 may have a refractive index n2, the third layer 150-3 may have a refractive index n3, the lens 151 may have a refractive index n4, and an environment outside the lens layer 15', for example, the atmosphere, may have a refractive index n5. Therefore, in the case that at least a part of light emitted by the first display area 10 and/or the second display area 20 can be guided by the substrate 150 and the lens 151 to a position above the first frame 110 and/or the second frame 210 to emit, all parts of the lens layer 15' may be formed of various materials, thicknesses, or refractive indexes.

For example, according to an embodiment of the present invention, the first layer 150-1 may be formed of glass or a polarizer (POL) and may have a refractive index n1 of 1.5 and a thickness L1 of 0.7 mm. The second layer 150-2 may be formed of polymethylmethacrylate (PMMA) and may have a refractive index n2 of 1.5 and a thickness L2 of 4 mm. The third layer 150-3 may be formed of a lens base and may have a refractive index n3 of 1.5 and a thickness L3 of 0.1 mm. The lens 151 may have a refractive index n4 of 1.63 and a thickness S of 0.013 mm. The atmosphere may have a refractive index n5 of 1. However, the foregoing descriptions are merely exemplary, and the present invention is not limited herein.

According to a preferred embodiment of the present invention, the thickness S of the lens 151 may be the curvature radius r1 of the lens 151, and the lens width P may be twice the curvature radius r1. That is, the lens 151 may be a semi-circle. However, based on processing limitations, referring to FIG. 4, the lens 151 may alternatively be set to be in a shape close to a semi-circle. In this case, the thickness S of the lens 151 may be less than and close to the curvature radius r1 of the lens 151, and the lens width P is less than and close to twice the curvature radius r1. For example, according to an embodiment of the present invention, the lens 151 may have a curvature radius r1 of 0.02 mm, a thickness S of 0.013 mm, and a lens width P of 0.0375 mm. However, the foregoing descriptions are merely exemplary, and the present invention is not limited herein.

Figure 5:
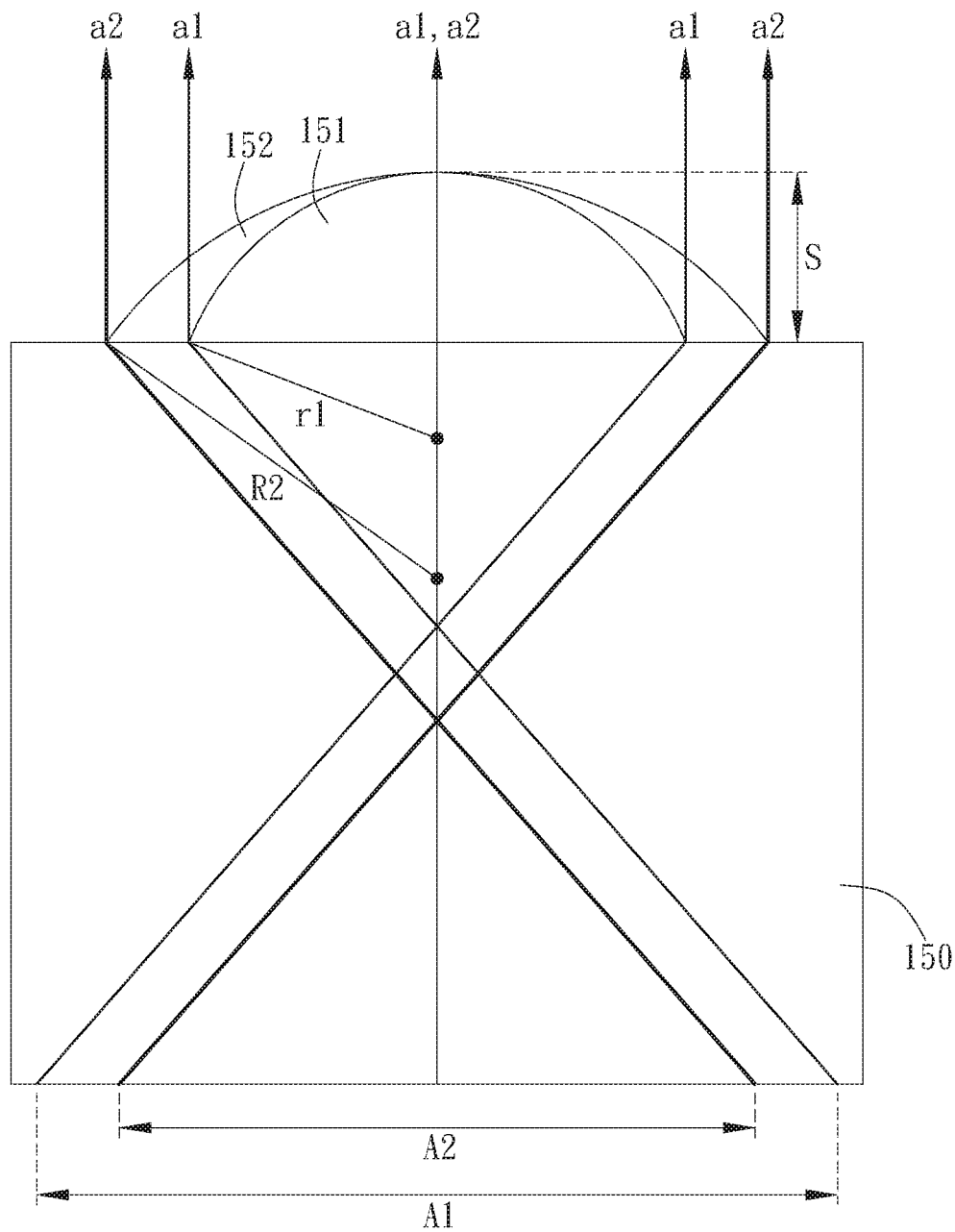
FIG. 5 is a schematic diagram for illustrating relationships between curvature radii of lenses and light receiving ranges according to different embodiments of the present invention.

Subsequently, referring to FIG. 5, FIG. 5 illustrates relationships between curvature radii of lenses and light receiving ranges according to an embodiment of the present invention. For brief presentation, it is assumed that the substrate 150 merely includes one layer or a plurality of layers with the same or similar refractive indexes. However, it should be known by persons of ordinary skill in the art that the case in which the substrate 150 includes a plurality of layers with different refractive indexes shall fall within the specific principle and concept described below.

As shown in FIG. 5, with the same material of lenses, a light receiving range A1 of which light a1 is capable of being received and guided to a position above a lens 151 to emit by the lens 151 with a smaller curvature radius r1 may be greater than a light receiving range A2 of which light a2 is capable of being received and guided to a position above the lens 152 to emit by the lens 152 with a larger curvature radius r2. In details, a range within which the light emitted from the first display panel and/or the second display panel can be guided to the lens and be emitted from the position above the lens is the light receiving range, and when refracted and transmitted through the same substrate 150, the lens 151 having the smaller curvature radius r1 may include the larger light receiving range A1 and the lens 152 having the larger curvature radius r2 may include the smaller light receiving range A2. Further, a smaller curvature radius of the lens indicates a shorter distance for the light to scatter after being emitted from the lens, thereby achieving the effect of blurring the black edge or black line. Therefore, to enable the lens to receive light emitted from a pixel from a large light receiving range, the curvature radius may be reduced (to enlarge the curvature) as far as possible when other limiting conditions permit.

According to an embodiment of the present invention, the light receiving range of a single lens may include widths of 5 to 10 or more pixels (the first pixels or the second pixels). In addition, according to another embodiment of the present invention, the light receiving range of a single lens may include at least a complete group of red pixels, green pixels, and blue pixels, so that white light can be emitted. However, the present invention is not limited herein.

Figure 4:
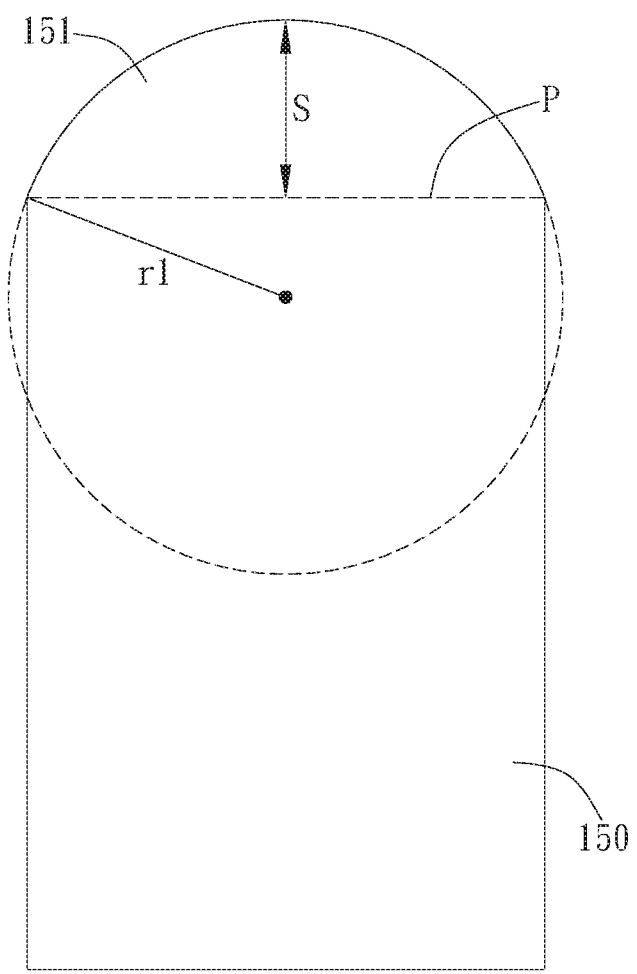
FIG. 4 is a schematic diagram for illustrating a curvature radius, a lens thickness, and a lens width of a lens according to an embodiment of the present invention.
Figure 6:
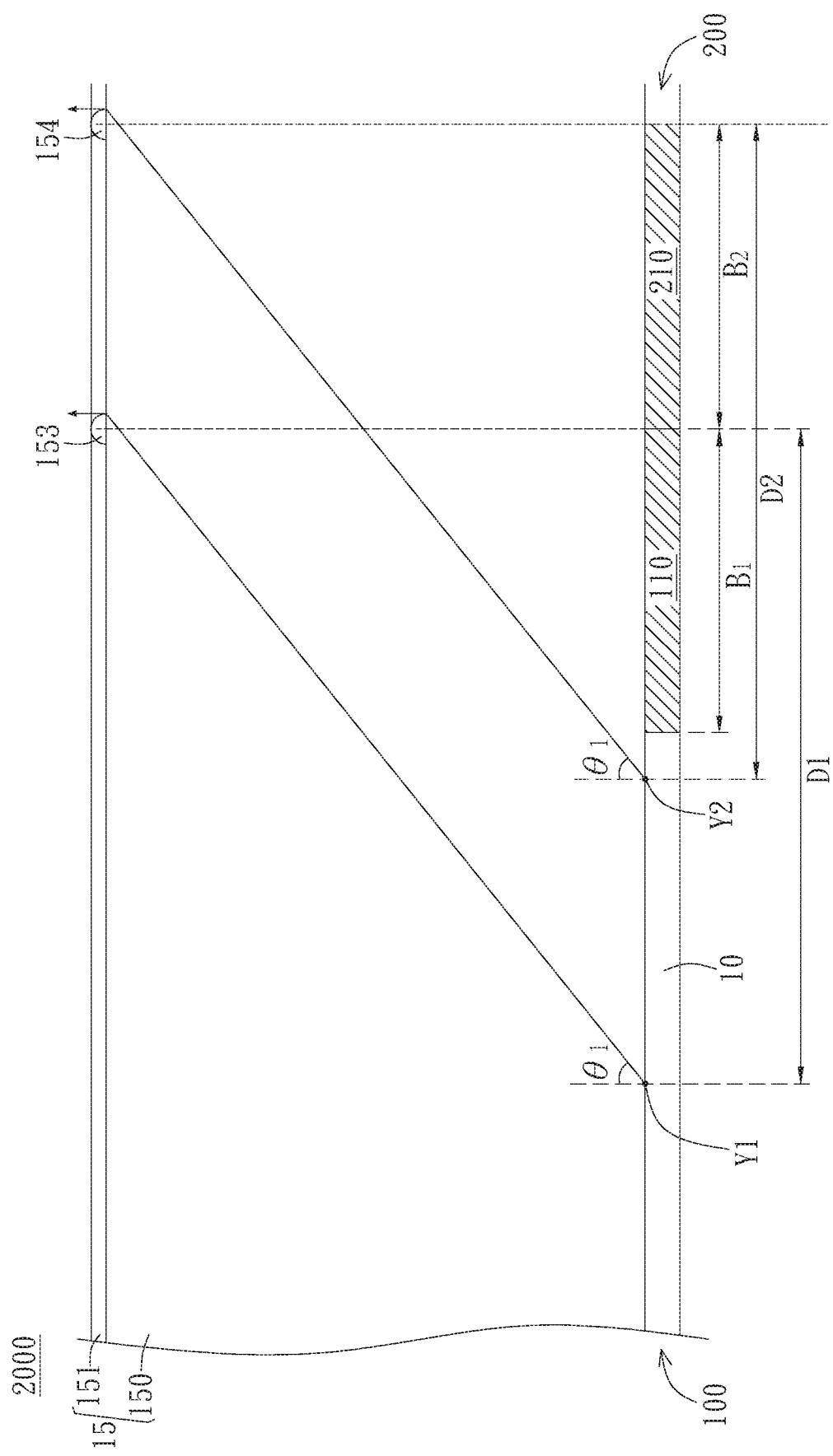
FIG. 6 is a schematic diagram illustrating that the light receiving ranges of the lenses covers at least a part of the display areas out of a frame according to different embodiments of the present invention.
Figure 7A:
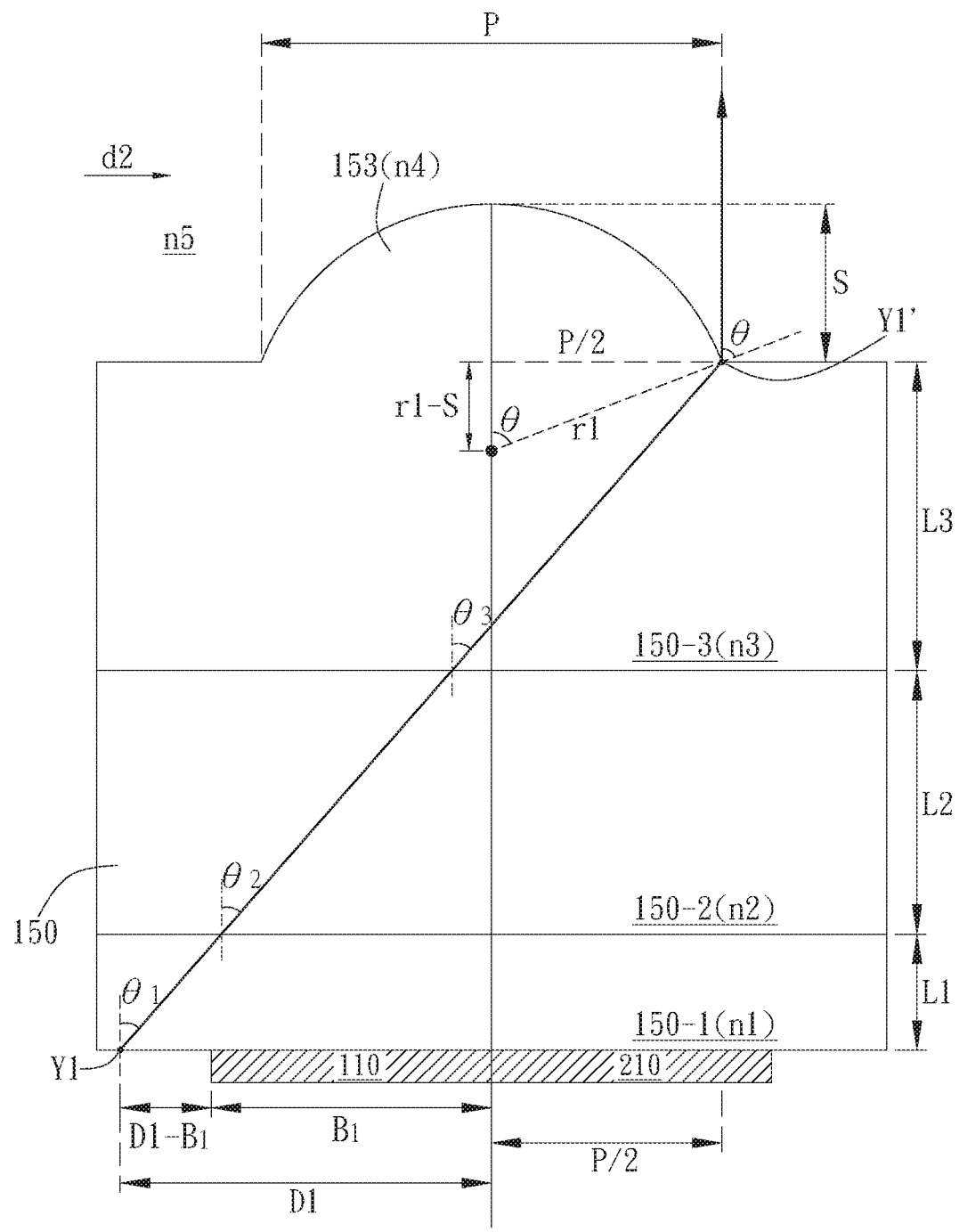
FIG. 7A to FIG. 7C are schematic diagrams for illustrating the light receiving ranges of the lenses and sizes and properties of all corresponding components derived at different positions of FIG. 6 according to different embodiments of the present invention.
Figure 7B:
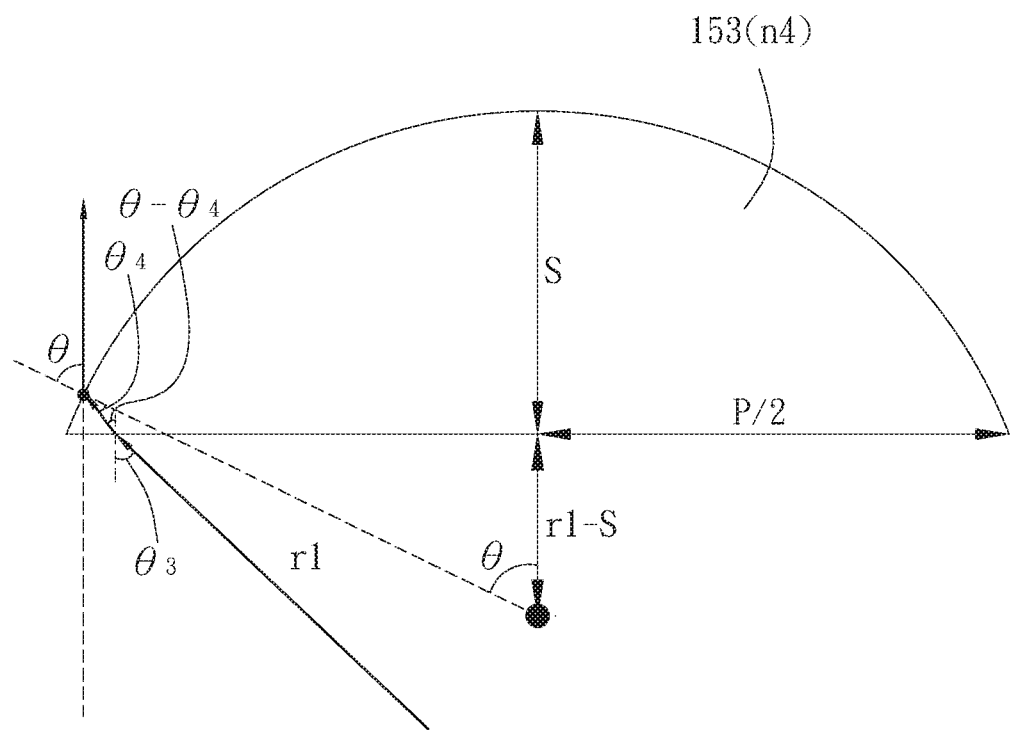
Figure 7C:
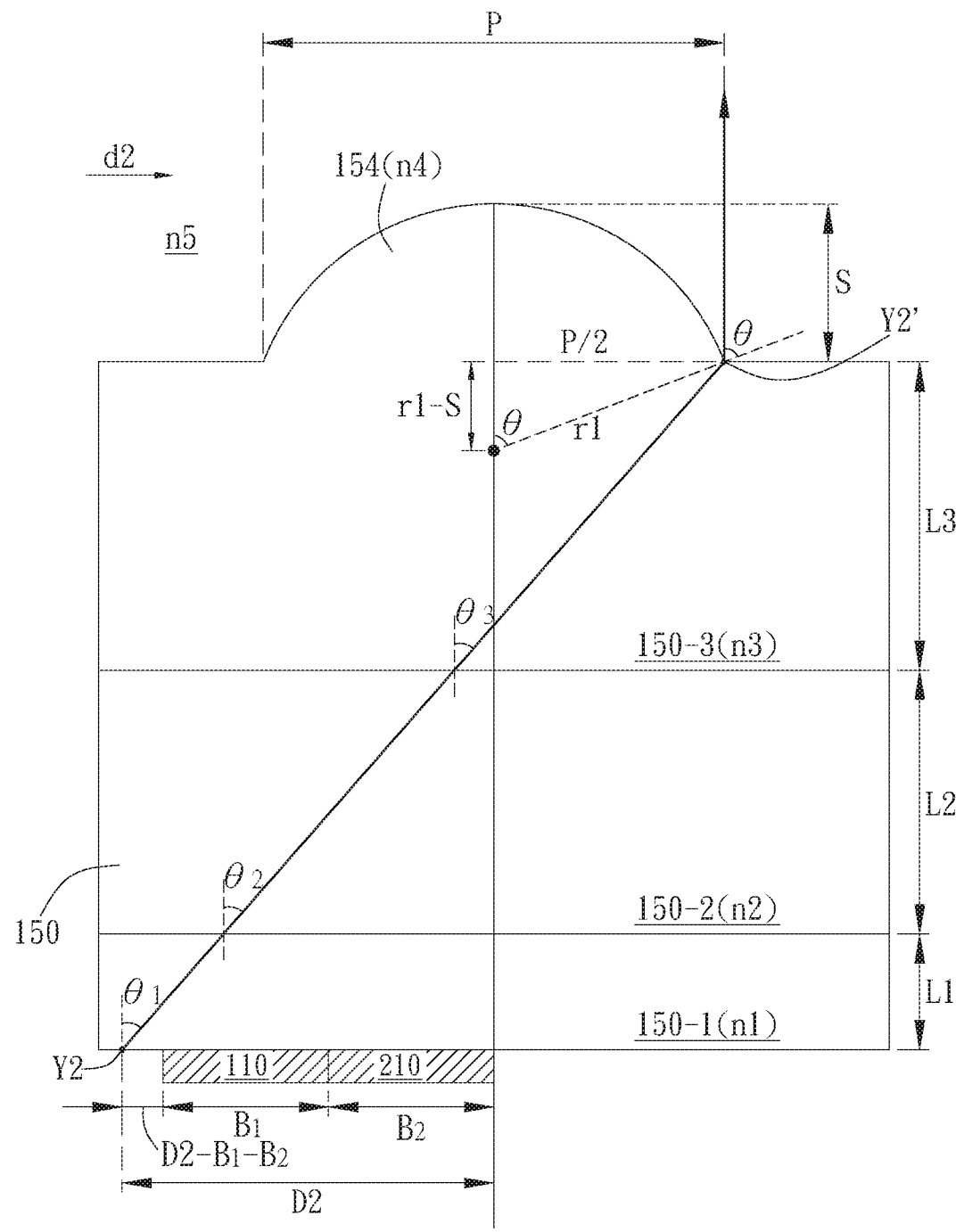

Based on the foregoing descriptions with reference to FIG. 4 and FIG. 5, further referring to FIG. 6 to FIG. 7C, examples of derived equations for a frame width B1 of the first frame 110, a frame width B2 of the second frame 210, a lens width P, a lens thickness S, a lens curvature, a degree of a light refraction angle or a light incident angle, and thicknesses of all the layers of the substrate 150 are specifically described according to different embodiments of the present invention.

As described above, according to an embodiment of the present invention, the ratios and relative ratios of all the components such as the lenses, pixels, and frames can be freely adjusted according to the demands upon at least a part of light emitted from the display areas can be guided to the lenses above the first frame 110 and/or the second frame 210 to emit.

For example, referring to the cross-sectional diagram of a display device 2000 shown in FIG. 6, an implementation of lenses in the display device 2000 is described exemplarily according to an embodiment of the present invention. Other than the implementation of the lenses described specifically, the other structures of the display device 2000 are the same as those of the display device 1000 in FIG. 1A to FIG. 2, and details are not described again herein. That is, the display device 2000 may include a first display panel 100 and a second display panel 200 and a lens layer 15 disposed on the first display panel 100 and the second display panel 200. Two specific lenses 153 and 154 in the lens layer 15 of the display device 2000 are used as an example to derive and describe the light receiving ranges and settings of the equations. However, according to the following descriptions, persons of ordinary skill in the art may correspondingly set other implementations of the lenses that are not specifically shown and described.

Specifically, referring to FIG. 6, the lens 153 is located between the first frame 110 and the second frame 210, and light incident on the substrate 150 from a position Y1 of the first display area 10 at an angle $\theta_1$ is guided to the lens 153 and vertically emitted from the lens 153. Based on the above, the derived equation for the components need to meet the condition that the light receiving range D1 from the position Y1 to a position corresponding to a center of the lens 153 is greater than the frame width B1 of the first frame 110, such that at least a part of light of the first display area 10 can emit vertically through the lens 153.

In detail, referring to FIG. 6 and FIG. 7A of a schematic enlarged diagram showing that light is incident on the substrate 150 and the lens 153, similar to the other embodiments above, the lens 153 may have a curvature radius r1, a lens width P, a thickness S, a refractive index n4, and the substrate 150 may have a first layer 150-1 (with a refractive index n1 and a thickness L1), a second layer 150-2 (with a refractive index n2 and a thickness L2), and a third layer 150-3 (with a refractive index n3 and a thickness L3). Further, the ambient refractive index is n5. In this case, a sum of the light receiving range D1 and a half of the lens width P can be calculated by using the thicknesses of the layers and the refraction angles of light at interfaces of the different layers, and an equation 1 is derived accordingly as follows:

$$D1 + P/2 = L1*\tan(\theta_1) + L2*\tan(\theta_2) + L3*\tan(\theta_3) \quad \text{equation 1:}$$

According to the foregoing equation 1, the condition that the light receiving range D1 is at least greater than the frame width B1 of the first frame 110 needs to be met such that at least a part of light can be guided to the lens 153 to emit, and therefore an equation 2 and an equation 3 can be correspondingly derived as follows:

$$D1 \geq B1 \quad \text{equation 2:}$$

$$L1*\tan(\theta_1) + L2*\tan(\theta_2) + L3*\tan(\theta_3) - P/2 \geq B1 \quad \text{equation 3:}$$

Therefore, all the elements in the equation 3 can be correspondingly adjusted freely according to this embodiment of the present invention as long as the equation 3 are satisfied, such that at least a part of light can be guided to the lens 153 to emit. Further, when the number of layers included in the substrate 150 is different from that described in FIG. 7A, an equation 4 below can also be derived according to the same principle based on the foregoing formula, and the lens and the at least one layer of the substrate satisfy the following equation 4:

$$\sum_{n=1}^{x} L_n \tan\theta_n - \frac{P}{2} \geq B_1, \quad \text{equation 4}$$

where x represents a total number of layers, Ln represents a thickness of an $n^{th}$ layer of substrate, $\theta_n$ represents a degree of a refraction angle of light incident on and entering the $n^{th}$ layer of substrate when the light is emitted from an edge of the lens in a direction perpendicular to the at least one layer of the substrate along a cross section taken in the direction d2 perpendicular to the extending direction of the first frame, P is a lens width along the cross section of the lens taken in the direction d2 perpendicular to the extending direction of the first frame, and B1 is a width of the first frame along a cross section taken in the direction d2 perpendicular to the extending direction of the first frame.

The light incident from the position Y1, guided to the lens 153, and emitted out of the lens 153 from the position Y1' has a degree of refraction angle θ based on that a connection line connecting the position Y1' and a curvature center of the lens 153 is the normal. Therefore, referring to FIG. 6 and FIG. 7A, the angle θ may be derived by an equation 5 as follows based on trigonometric function:

$$\theta = \arctan[P/(2(r1-S))]. \quad \text{equation 5:}$$

Further, referring to FIG. 6, FIG. 7A, and FIG. 7B, the degrees of refraction angles $\theta_1$, $\theta_2$, $\theta_3$, and $\theta_4$ of the other layers can be derived from the degree of the refraction angle θ of emission from the lens 153 to the environment based on the Snell's law. That is, based on the Snell's law, the refraction angles and the incident angles of the adjacent layers at interface satisfy an equation 6 to an equation 9 as follows:

$$n5*\sin(\theta) = n4*\sin(\theta_4); \quad \text{equation 6:}$$

$$n4*\sin(\theta-\theta_4) = n3*\sin(\theta_3); \quad \text{equation 7:}$$

$$n2*\sin(\theta_2) = n3*\sin(\theta_3); \quad \text{equation 8:}$$

$$n1*\sin(\theta_1) = n2*\sin(\theta_2). \quad \text{equation 9:}$$

Therefore, based on the above, since θ substantially satisfy the equation 5, the degree of the angle θ (or the curvature radius r1, the lens thickness S, and/or the lens width P) can be used to derive the angles $\theta_3$, $\theta_2$ and $\theta_1$ sequentially based on the equation 5 to the equation 9. That is, the parameters of the lens 153 and the substrate 150 may be derived mainly based on the equation 5 and the equation 3 (or the equation 4) in connection with the equation 6 to the equation 9, and as long as the relevant equations can be satisfied such that at least a part of light can be guided to the lens 153 to emit, the properties and sizes of the lens 153 and the other components in the display device can be adjusted freely.

Next, again referring to FIG. 6, the light receiving and the derivation of equations with respect to the lens 154 according to another embodiment of the present invention will be described below.

Specifically, referring to FIG. 6 and FIG. 7C, the center of the lens 154 is exactly aligned with an edge of the second frame 210 that is not joint to the first frame 110, and the lens 154 has a longer distance apart from the first display area 10 relative to the lens 153. According to another embodiment of the present invention, the lens 154 may also receive light from the first display area 10 and emit light from the lens 154. For example, light incident from a position Y2 of the first display area 10 on the substrate 150 at an angle $\theta_1$ and guided to the lens 154 may be emitted vertically from the lens 154. That is, the position Y2 is a position which has the largest distance from the lens 154 in which emergent light can be guided to the lens 154 to emit. Based on the above, for example, the equation needs to satisfy the condition that a light receiving range D2 from the position Y2 to a position corresponding to the center of the lens 154 is greater than a sum of the frame width B1 of the first frame 110 and the frame width B2 of the second frame 210, such that at least a part of light can be emitted vertically through the lens 154.

In detail, referring to FIG. 6 and FIG. 7C of a schematic enlarged diagram showing that light is incident on the substrate 150 and the lens 154, similar to the embodiment shown in FIG. 7A above, the lens 154 may have a curvature radius r1, a lens width P, a thickness S, a refractive index n4, and the substrate 150 may have a first layer 150-1 (with a refractive index n1 and a thickness L1), a second layer 150-2 (with a refractive index n2 and a thickness L2), and a third layer 150-3 (with a refractive index n3 and a thickness L3). Further, the ambient refractive index is n5. In this case, similar to the foregoing equation 1, a sum of the light receiving range D2 and a half of the lens width P can be calculated by using the thicknesses of the layers and the refraction angles of light, and an equation 10 is derived accordingly as follows:

$$D2+P/2=L1*\tan(\theta_1)+L2*\tan(\theta_2)+L3*\tan(\theta_3)$$ equation 10:

According to the foregoing equations, the condition that the light receiving range D2 is at least greater than the sum of the frame width B1 of the first frame 110 and the frame width B2 of the second frame 210 needs to be met such that at least a part of light of the first display area 10 can be guided to the lens 154 to emit, and therefore an equation 11 and an equation 12 can be correspondingly derived as follows:

$$D2 \geq B1+B2$$ equation 11:

$$L1*\tan(\theta_1)+L2*\tan(\theta_2)+L3*\tan(\theta_3)-P/2 \geq B1+B2$$ equation 12:

Accordingly, the elements can be adjusted freely according to this embodiment of the present invention as long as the equation 12 is satisfied. Further, when the number of layers included in the substrate 150 is different from that described in FIG. 7C, an equation 13 below can also be derived according to the same principle based on the foregoing formula, and the lens and the at least one layer of the substrate satisfy the following equation 13:

$$\sum_{n=1}^{x} L_n \tan\theta_n - \frac{P}{2} \geq B_1 + B_2,$$ equation 13 where x represents a total number of layers, Ln represents a thickness of an $n^{th}$ layer of substrate, $\theta_n$ represents a degree of a refraction angle of light incident on and entering the $n^{th}$ layer of substrate when the light is emitted from an edge of the lens in a direction perpendicular to the at least one layer of the substrate along a cross section taken in the direction d2 perpendicular to the extending direction of the first frame, P is a lens width along the cross section of the lens taken in the direction d2 perpendicular to the extending direction of the first frame, B1 is a width of the first frame along a cross section taken in the direction d2 perpendicular to the extending direction of the first frame, and B2 is a width of the second frame along a cross section taken in the direction d2 perpendicular to the extending direction of the first frame.

Apart from the differences from the equations shown with respect to FIG. 7A, the other content of the equations of this embodiment of the lens 154 shown in FIG. 6 are essentially the same as those in FIG. 7A and FIG. 7B, and details are not redundantly described herein. For example, this embodiment of the lens 154 shown in FIG. 6 may also be correspondingly derived based on the equation 5 to the equation 9 in combination with the equation 12 (or the equation 13), and when the relevant equations are satisfied such that at least a part of light can be guided to the lens 154 to emit, the sizes and materials (corresponding to the refractive index) of the lens 154 and the other components in the display device can be adjusted freely. For example, to enable the entire display device to become thin and light, the thickness of the substrate 150 may be reduced, but the thickness of the substrate needs to be thick enough such that at least a part of light in the first display area or the second display area can be guided to the first frame or the second frame to emit. Alternatively, other factors may be deduced and designed by predetermining the number of pixels expected to be placed in the light receiving range. Therefore, corresponding ranges of the curvature radius, the lens width, the lens thickness, or the like of a lens having a light receiving range may also be derived by using the degree of the incident angle or the refraction angle.

In derivation according to the foregoing equations, according to an embodiment of the present invention, for example, the lens width P may be not greater than ⅕ of the pixel width. Alternatively, the lens width P may range from ⅕ to ⅙ of the pixel width. In addition, according to some embodiments of the present invention, the widths of the first frame 110 and the second frame 210 may respectively be twice the pixel width. That is, a sum of widths of the first frame 110 and the second frame 210 in the direction d2 perpendicular to the extending direction d1 of the first frame 110 may be approximately quadruple of the pixel width. However, the foregoing descriptions are all merely exemplary, the present invention is not limited herein as long as the foregoing equation 1 to the equation 13 derived with reference to FIG. 6 to FIG. 7C and other equations derived based on the corresponding or similar principles are satisfied.

Although the degrees of first incident and refractive angles of light incident on the substrate 150 with respect to the lenses 153 and 154 are both $\theta_1$, this is merely exemplary, and the present invention is not limited herein. For example, the degrees of the first incident and refractive angles of light incident on the substrate 150 with respect to the lenses 153 and 154 may be essentially the same or different. Besides, for the lenses at other positions other than the lenses 153 and 154, persons of ordinary skill in the art may likewise obtain an expected light receiving range from which at least a part of light can be guided to the lens to emit, and correspondingly adjust the factors such as the thickness, width, or the like of the lens or other components in the display device freely with reference to the foregoing descriptions and derivation, and details are not described again herein.

Hereinafter, a display device 3000 according to another embodiment of the present invention with reference to FIG. 8A and FIG. 8B will be further described.

Figure 8A:
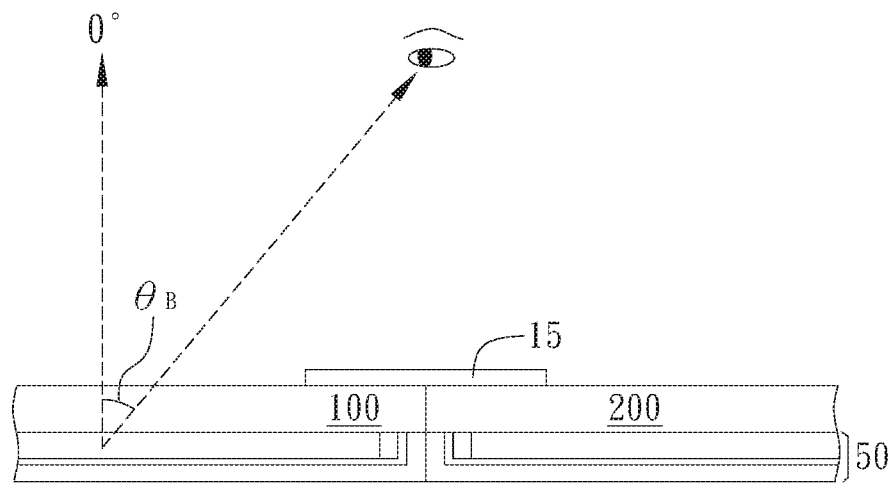
FIG. 8A is a schematic diagram of a display device including a backlight module according to an embodiment of the present invention.
Figure 8B:
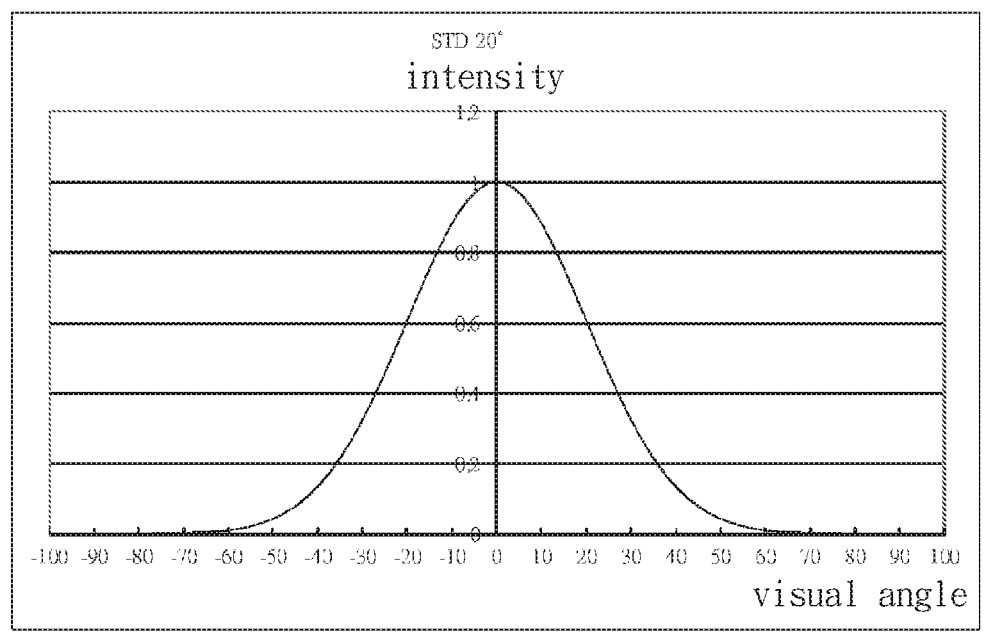
FIG. 8B is a schematic diagram of an example of an intensity-visual angle distribution curve of backlight of a backlight module according to an embodiment of the present invention.

Referring to FIG. 8A, the display device 3000 further includes a backlight module 50 disposed on the first display panel 100 (and/or the second display panel 200) at a side opposite to the lens layer 15. The backlight module 50 may generate backlight incident on the first display panel 100 (and/or the second display panel 200).

As described above, the backlight may have an intensity of 1 at a visual angle of the normal direction (0°) after standardization (normalization), and may have another intensity at another visual angle of $\theta_B$. Therefore, the backlight generated by the backlight module 50 may have an intensity-visual angle distribution curve by using the normal direction (0°) as an average. For example, according to an embodiment of the present invention, the intensity-visual angle distribution curve of the backlight of the backlight module 50 may be shown in FIG. 8B, and a standard deviation is equal to 20°. However, the foregoing descriptions are merely exemplary, and the present invention is not limited herein.

Based on the intensity-visual angle distribution curve of the backlight of the backlight module 50, a total brightness of emitted light of each lens can be calculated. Specifically, by tracking the angle (corresponding to the visual angle of the backlight) at which light emitted from all positions of the lens is incident on the substrate, calculating a reflectance and a refractive index or transmittance of the light at each interface, and integrating the brightness of light of all the angles emitted from the lens based on the intensity-visual angle distribution curve of the backlight, and then deducting a range that may be shielded by a black edge generated by the frame from the light receiving range of the lens, a total brightness generated by the lens at a specific position can be obtained based on the intensity-visual angle distribution curve of the backlight of the backlight module 50. For example, referring to FIG. 9A, the light receiving range incident from a right side of a central line of the lens at different angles (visual angles) to a left side of the lens includes the black edge generated by the frame, no light is incident from a range corresponding to a visual angle $\theta_{v0}$ to a visual angle $\theta_{v1}$ shielded by the black edge on the lens, and therefore the light in this section that cannot be emitted out from the lens needs to be deducted correspondingly when calculating the total brightness of the lens based on the intensity-visual angle distribution curve of the backlight. For example, the light receiving range at the left side of the lens is from the visual angle $\theta_{v0}$ to a visual angle $\theta_{v2}$, but the light receiving range corresponding to the visual angle $\theta_{v0}$ to the visual angle $\theta_{v1}$ is shielded by the black edge, and therefore the visual angle range that can be actually incident on the left side of the lens is from the visual angle $\theta_{v1}$ to the visual angle $\theta_{v2}$. For example, in FIG. 9A, according to an embodiment of the present invention, the visual angle $\theta_{v0}$ may be 0°, the visual angle $\theta_{v1}$ may be 26°, and the visual angle $\theta_{v2}$ may be 38°. In this case, the light receiving range at the left side of the lens is from the visual angle of 0° to the visual angle of 38°, but the light receiving range corresponding to the visual angle of 0° to the visual angle of 26° is shielded by the black edge, and therefore the visual angle range that can be actually incident on the left side of the lens is from the visual angle of 26° to the visual angle of 38°.

Figure 9A:
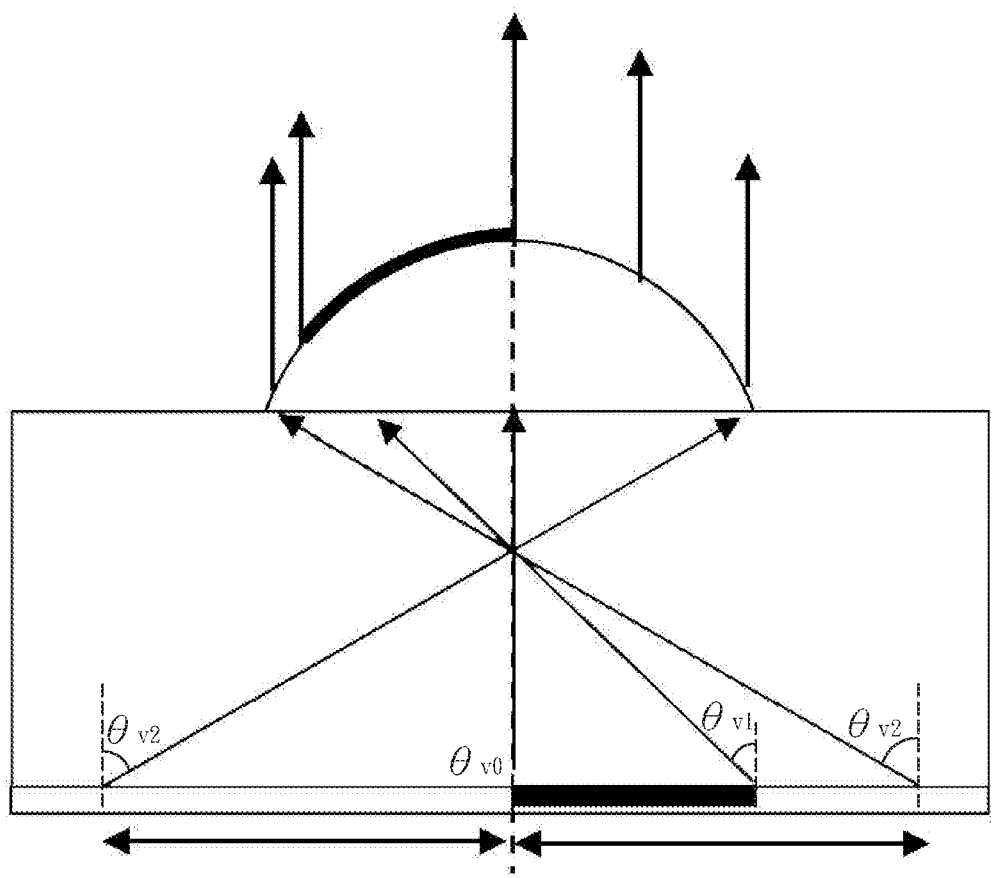
FIG. 9A to FIG. 11D are schematic diagrams of light emitting total integration of lenses based on the corresponding intensity-visual angle distribution curves of backlight according to different embodiments of the present invention.
Figure 9B:
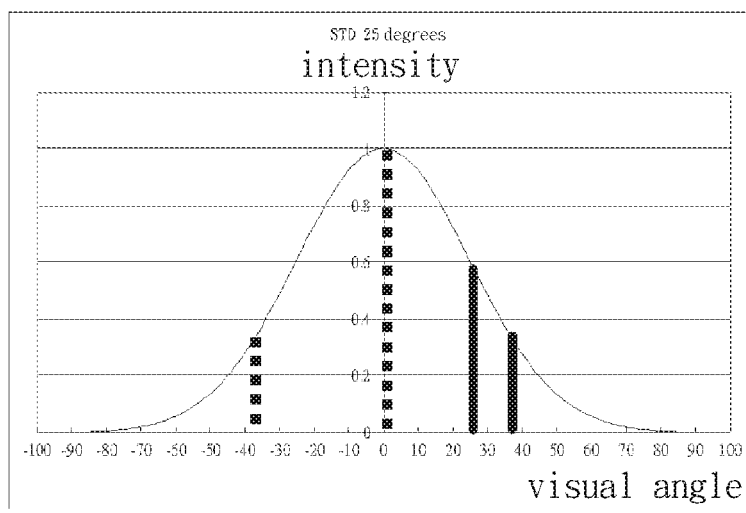
Figure 9C:
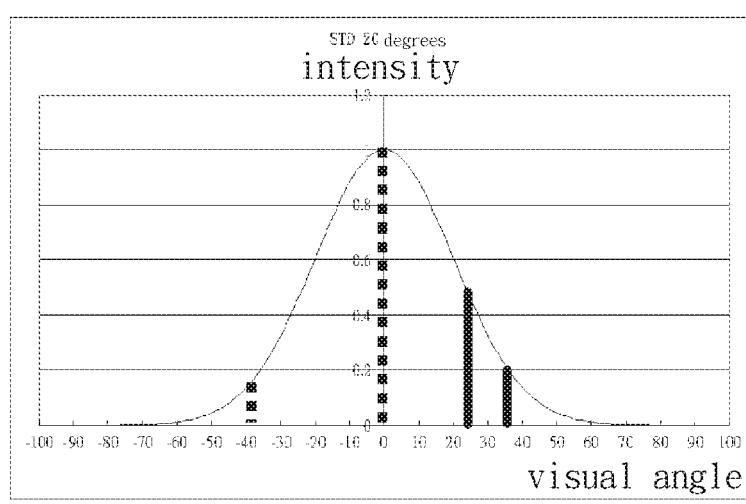
Figure 9D:
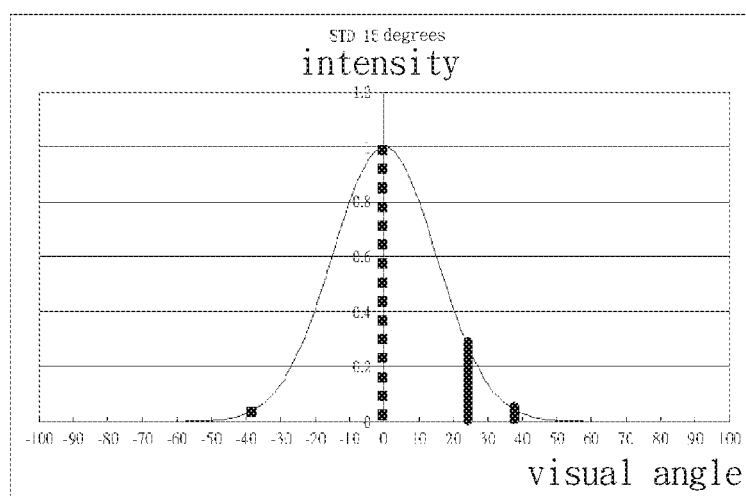
Figure 10A:
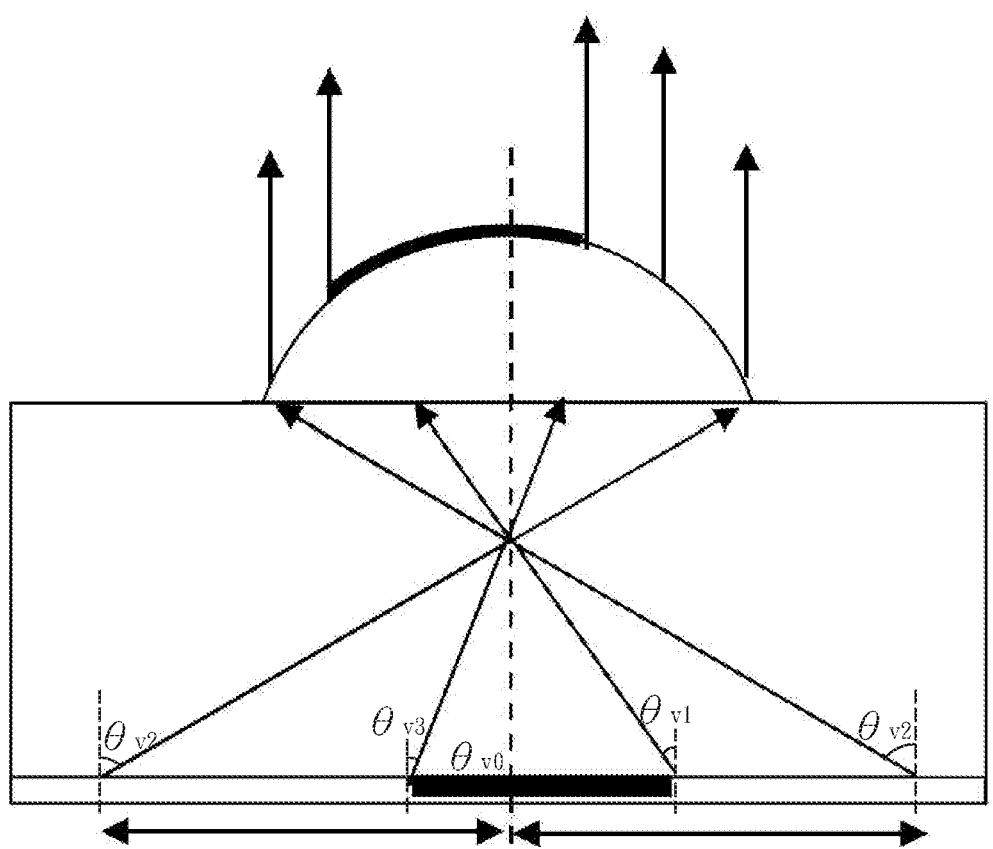
Figure 10B:
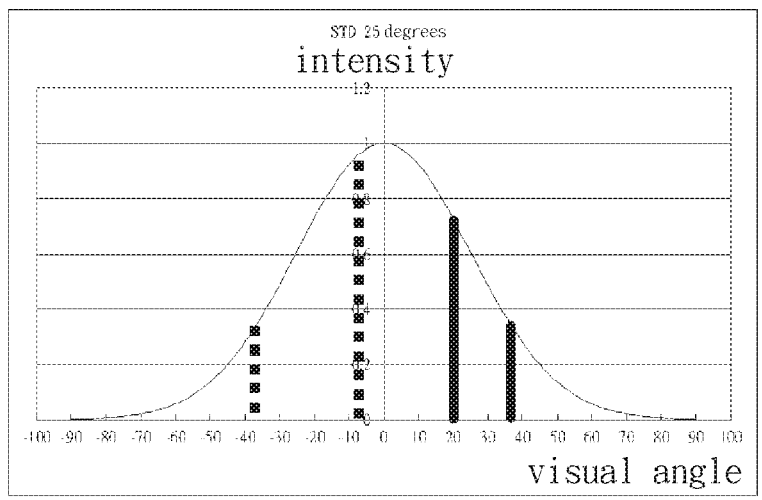
Figure 10C:
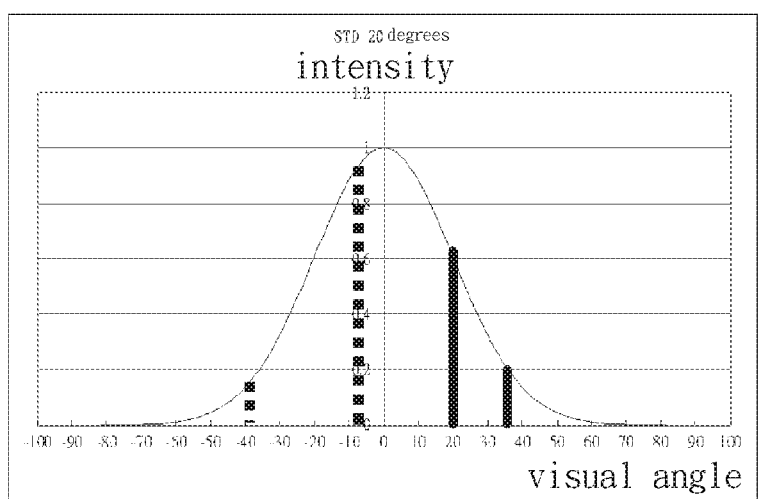
Figure 10D:
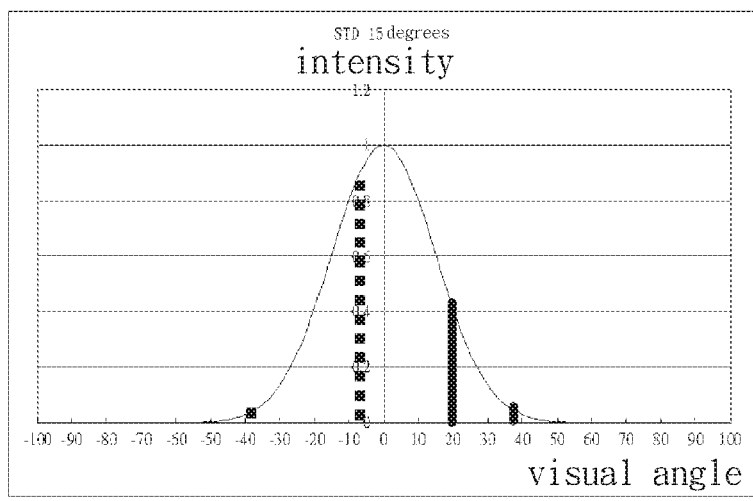
Figure 11A:
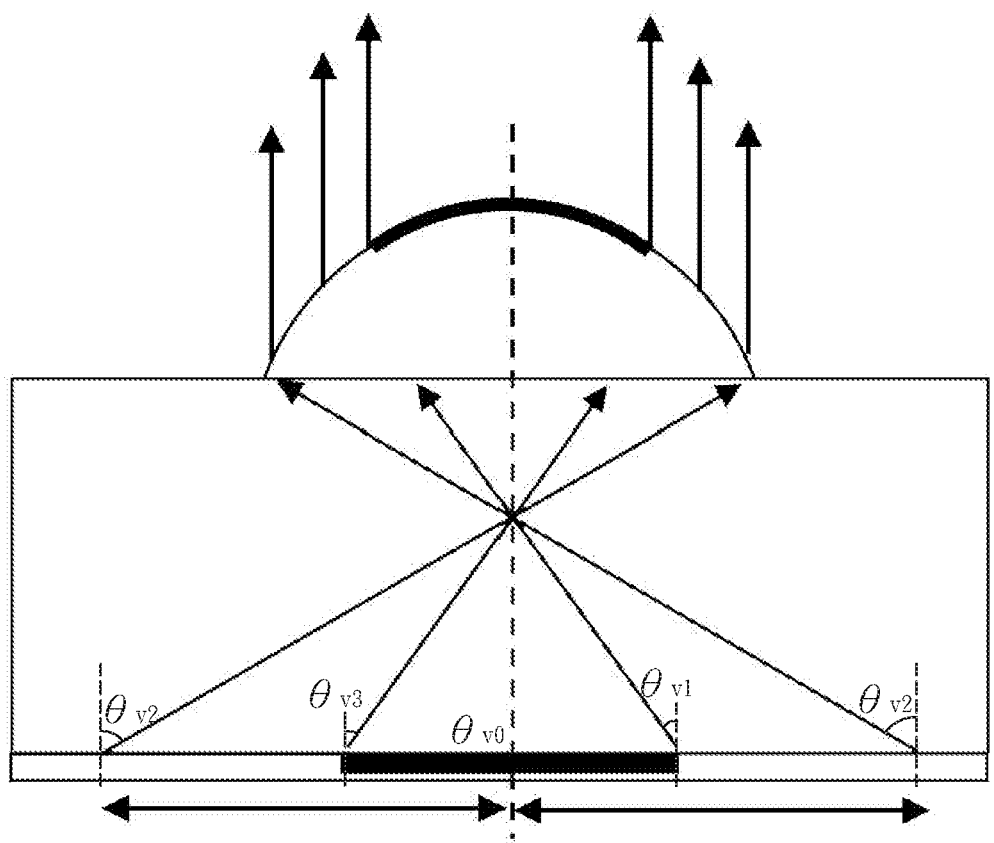
Figure 11B:
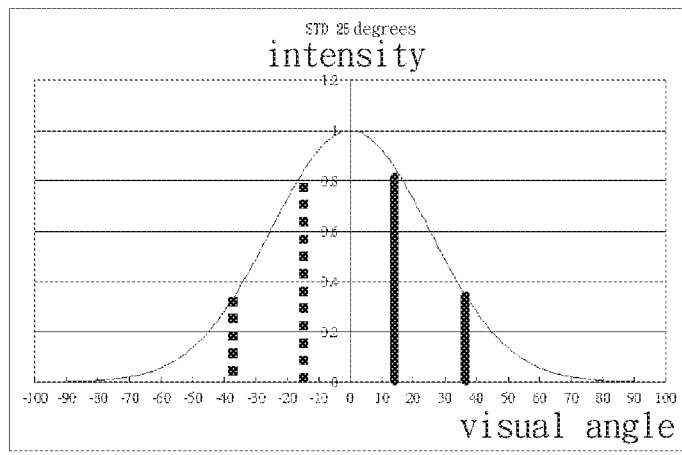
Figure 11C:
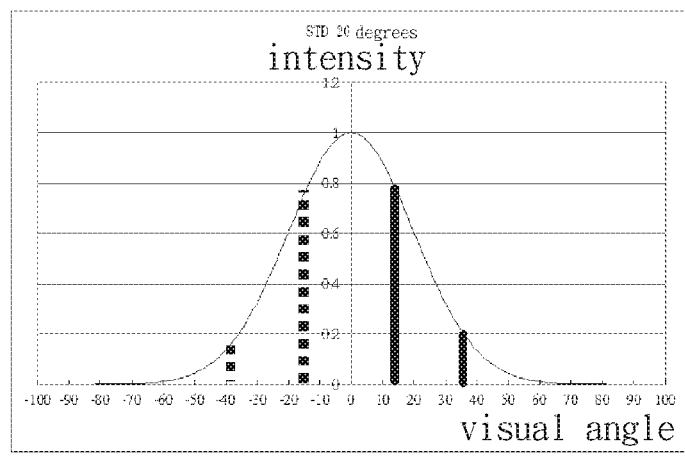
Figure 11D:
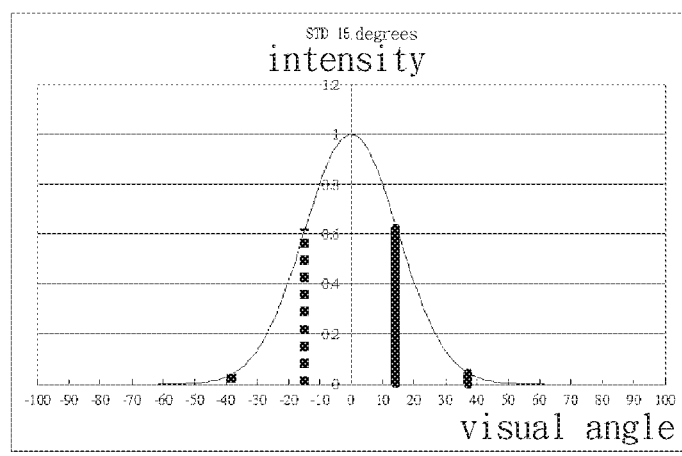

As described above, according to some embodiments of the present invention, the schematic diagrams of total integration of the brightness of emission from the lens in which a region is shielded by the black edge corresponding to the intensity-visual angle distribution curves of the backlight of different standard deviations are shown in FIG. 9A to FIG. 11D. In detail, FIG. 9A is a schematic diagram of a lens in which a part of the angle is shielded by the frame and which can receive light from another angle range according to an embodiment of the present invention. FIG. 9B to FIG. 9D respectively show the intensity-visual angle distribution curves of the backlight based on different standard deviations, corresponding to the schematic diagram of FIG. 9A showing a light receiving range and a shielded range. FIG. 10A is a schematic diagram of a lens in which a part of the angle is shielded by the frame and which can receive light from another angle range according to an embodiment of the present invention. In addition, FIG. 10B to FIG. 10D respectively show the intensity-visual angle distribution curves of the backlight based on different standard deviations, corresponding to the schematic diagram of FIG. 10A showing a light receiving range and a shielded range. FIG. 11A is a schematic diagram of a lens in which a part of the angle is shielded by the frame and which can receive light from another angle range according to an embodiment of the present invention. In addition, FIG. 11B to FIG. 11D respectively show the intensity-visual angle distribution curves of the backlight based on different standard deviations, corresponding to the schematic diagram of FIG. 11A showing a light receiving range and a shielded range. FIG. 9A, FIG. 10A, and FIG. 11A are corresponding schematic diagrams of visual angles at which backlight is incident on a lens. For example, in FIG. 9A, as described above, according to an embodiment of the present invention, the visual angle $\theta_{v0}$ may be 0°, the visual angle $\theta_{v1}$ may be 26°, and the visual angle $\theta_{v2}$ may be 38°. In addition, in FIG. 10A, the visual angle $\theta_{v0}$ may be 0°, the visual angle $\theta_{v1}$ may be 20°, the visual angle $\theta_{v2}$ may be 38°, and the visual angle $\theta_{v3}$ may be 7°. In FIG. 11A, the visual angle $\theta_{v0}$ may be 0°, the visual angle $\theta_{v1}$ may be 14°, the visual angle $\theta_{v2}$ may be 38°, and the visual angle $\theta_{va}$ may be 14°. In FIG. 10A and FIG. 11A, the light receiving range at the left side of the lens is from the visual angle $\theta_{v0}$ to the visual angle $\theta_{v2}$, but the light receiving range corresponding to the visual angle $\theta_{v0}$ to the visual angle $\theta_{v1}$ is shielded by the black edge, and therefore the visual angle range that can be actually incident on the left side of the lens is from the visual angle $\theta_{v1}$ to the visual angle $\theta_{v2}$. Moreover, the light receiving range at the right side of the lens is from the visual angle $\theta_{v0}$ to the visual angle $\theta_{v2}$, but the light receiving range corresponding to the visual angle $\theta_{v0}$ to the visual angle $\theta_{v3}$ is shielded by the black edge, and therefore the visual angle range that can be actually incident on the right side of the lens is from the visual angle $\theta_{v3}$ to the visual angle $\theta_{v2}$. However, the foregoing are only examples, instances of the visual angles and the range that may be shielded are not limited herein, and persons of ordinary skill in the art may correspondingly derive a total brightness generated by the lens at a specific position based on the intensity-visual angle distribution curve with reference to the foregoing descriptions.

Based on the results of FIG. 9A to FIG. 11D, according to an embodiment of the present invention, preferably, a backlight module whose standard deviation of the intensity-visual angle distribution curve of the backlight is greater than 20° is used. In this way, although a part of incident light of the lens is shielded by the black edge, there is still another part of light that can be incident on the lens and emitted from the lens, so that the total brightness of the emergent light of the lens can be maintained at a relatively high level. Further, according to another embodiment of the present invention, a backlight module whose standard deviation of the intensity-visual angle distribution curve of the backlight is greater than 25° may be used to obtain an optimal effect.

In addition, according to an embodiment of the present invention, for a backlight source of a specific intensity-visual angle distribution, a light-emitting intensity of a visual angle corresponding to an incident angle that can be guided and incident on the lens farthest from the lens may be selected to be ⅓ of that of the visual angle of 0°, so as to prevent the light-emitting intensity of the light from being absorbed and excessively weakened after passing through a plurality of layers in the substrate. In detail, assuming that the visual angle corresponding to the incident angle that can be guided and incident on the lens farthest from the lens is 40°, and the backlight has a preset light-emitting intensity at the visual angle of 40°, the light incident at the visual angle of 40° may be weakened (for example, absorbed or partially reflected) after passing though the plurality of layers in the substrate. Therefore, the light-emitting intensity of the light emitted from the lens may become excessively small or the light may vanish after passing through the plurality of layers if the preset light-emitting intensity is excessively small. Therefore, the preset light-emitting intensity of the specific visual angle (for example, 40°) needs to be set to be higher than a value, such that light incident at the specific visual angle can be emitted from the lens with an expected intensity. For example, according to an embodiment of the present invention, relative to the intensity of 1 of the backlight at the visual angle of the normal direction (0°) after standardization (normalization), the visual angle (40°) corresponding to the incident angle that can be guided and incident on the lens farthest from the lens may have a preset light-emitting intensity of ⅓. However, to avoid excessive energy consumption caused by excessively strong light intensities of other visual angles apart from the front visual angle, a ratio of the light-emitting intensity of the visual angle corresponding to the incident angle that can be guided and incident on the lens farthest from the lens also needs to be controlled within a range. For example, the light-emitting intensity of the visual angle corresponding to the incident angle that can be guided and incident on the lens farthest from the lens may be selected to be ⅓ to ½ of that of the visual angle of 0°. However, the foregoing visual angles and ratios of the light-emitting intensities are all exemplary, and the present invention is not limited herein.

As described above, due to shielding of the black edge and the materials of the lenses, the intensity of light emitted through the lenses may be reduced. Therefore, the brightness of the first image adjustment area 16 and/or the second image adjustment area 26 shown in FIG. 1A to be adjusted may be determined by calculating the light transmittance difference based on the visual angle of 0° with/without the lenses. For example, referring to table 1 below, according to an embodiment of the present invention, when there is a lens, the transmittance may be 0.84 of that without one, but the present invention is not limited herein. In this embodiment, for the same first image source signal S1 or the same second image source signal S2 provided to the first display panel 100 or the second display panel 200, the brightness generated by the first pixels 101' or the second pixels 201' in the first image adjustment area 16 or the second image adjustment area 26 may be greater than 1.2 times of the brightness of the other first pixels 101 or second pixels 201 in the first display area 10 or the second display area 20, thereby compensating for the transmittance loss caused by the material of the lenses. However, the descriptions are merely exemplary, the actual compensated amount of light may be adjusted based on the transmittance of different materials of lenses.

TABLE 1

| | Without a lens | With a lens | Material transmittance |
|---|---|---|---|
| Brightness of emitted light incident at an incident angle of 0° | 369.4 | 310.3 | 0.840011 |

Besides, based on the light-emitting loss cause by shielding of the black edge, the degree of adjustment may also be increased. For example, when the brightness generated by the first pixels or the second pixels in the first image adjustment area 16 or the second image adjustment area 26 needs to be adjusted to be 1.2 times of the brightness of the other first pixels or the other second pixels in the first display area or the second display area based on the material and transmittance of the lens, actually the brightness generated by the first pixels or the second pixels in the first image adjustment area 16 or the second image adjustment area 26 may be adjusted to be 1.3 of the brightness of the other first pixels or the other second pixels in the first display area or the second display area, so as to partially compensate for light emitting loss cause by shielding of the black edge. However, the foregoing descriptions are merely exemplary, and the degree of adjustment of the first image adjustment area or the second image adjustment area can be designed correspondingly based on different materials and transmittance of the lenses and the compensation degree expected for shielding of the black edge, and the present invention is not limited herein.

Figure 12:
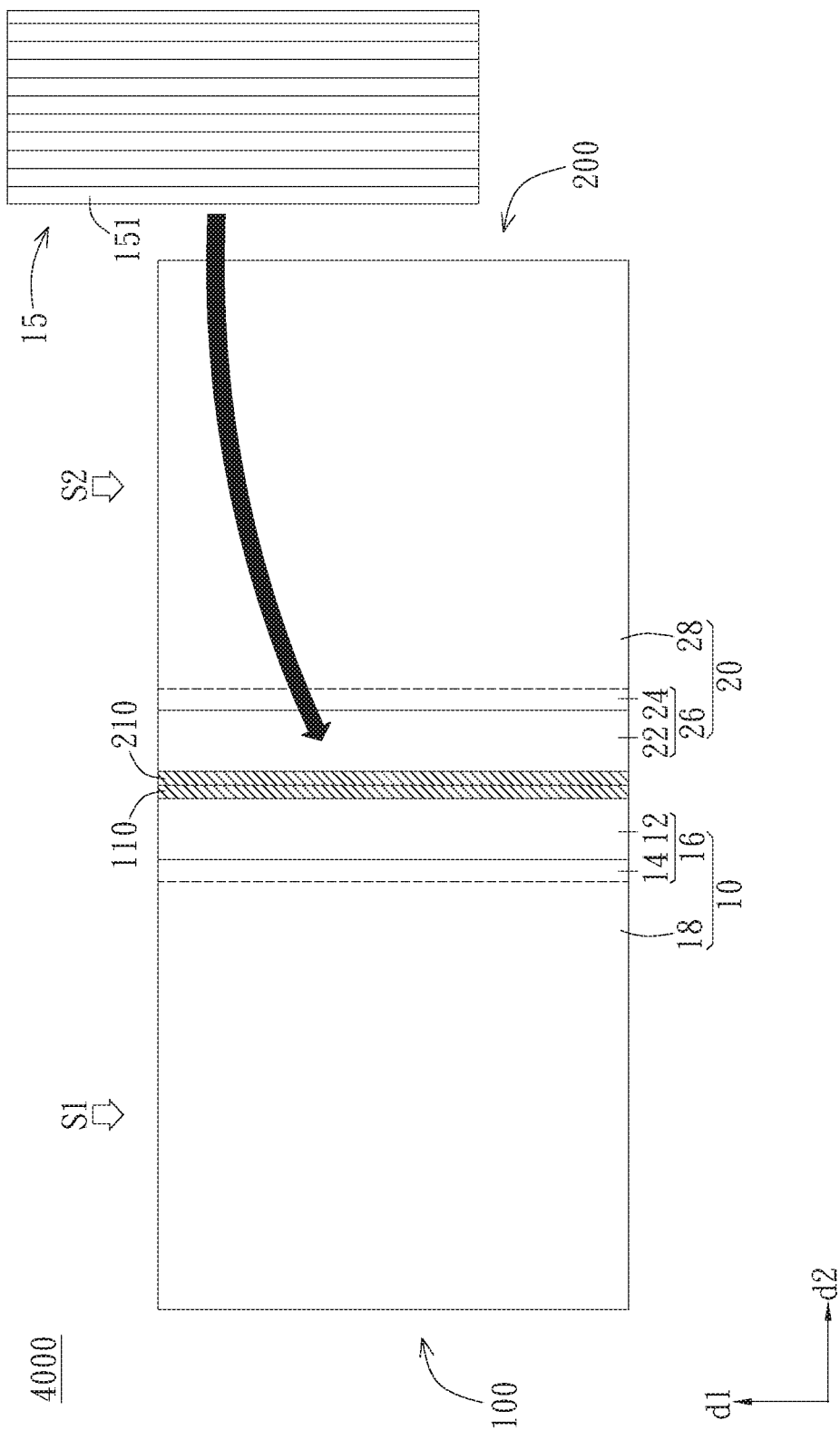
FIG. 12 is a schematic diagram of a display device according to another embodiment of the present invention.

According to still another embodiment of the present invention, referring to a display device 4000 shown in FIG. 12, a first image adjustment area 16 may include a first region 12 and a second region 14 respectively extending along the extending direction d1 of the first frame 110. The first region 12 and the second region 14 are arranged side by side and the first region 12 is closer to the first frame 110. In such configuration, the brightness generated by the first pixels in the first region 12 and the second region 14 is greater than that of the other first pixels in the first display area 10. Further, the brightness generated by the first pixels in the first region 12 is also greater than that generated by the first pixels in the second region 14.

Similar to the first image adjustment area 16, the second image adjustment area 26 shown in FIG. 12 may also include a first region 22 and a second region 24 respectively extending along the extending direction d1 of the second frame 210. The first region 22 and the second region 24 are arranged side by side and the first region 22 is closer to the second frame 210. In such configuration, the brightness generated by the second pixels in the first region 22 and the second region 24 is greater than that of the other second pixels in the second display area 20. Further, the brightness generated by the second pixels in the first region 22 is also greater than that generated by the second pixels in the second region 24.

Further, enhancement adjustment of different degrees may be performed according to the sections shown in FIG. 12, so as to avoid that the first image adjustment area 16 and/or the second image adjustment area 26 tends to be brighter than the first display area 10 and/or the second display area 20 when watching from a side, while achieving blurring of visual obviousness of the black edge and improving the display quality. For example, according to an embodiment of the present invention, the lens having a smaller light receiving range because a part of the light receiving range is shielded by the first frame 110 or the second frame 210 mainly receives light from the first region 12 or 22 for displaying, and therefore the brightness of the first region 12 or 22 may be greater than that of the second region 14 or 24, the brightness generated by the first pixels or the second pixels in the second region 14 or 24 for compensating the emitting light of the lens having less shielding by the black edge and a larger light receiving range is greater than that of the other first pixels or second pixels in the first display area 10 or the second display area 20.

For example, the brightness generated by the first pixels or the second pixels in the first region 12 or 22 is greater than 1.3 times of that generated by the other first pixels or second pixels in the first image default area 18 or the second image default area 28 of the first display area 10 or the second display area 20. The brightness generated by the first pixels or the second pixels in the second region 14 or 24 is greater than 1 to 1.3 times of that generated by the other first pixels or second pixels in the first image default area 18 or the second image default area 28 of the first display area 10 or the second display area 20, for example, 1.2 times. Alternatively, for example, when the first image source signal S1 or the second image source signal S2 indicates displaying red (R) in grayscale of 240, green (G) in grayscale of 240, and blue (B) in grayscale of 240, the brightness generated by the first pixels 101 or the second pixels 201 in the first image default area 18 or the second image default area 28 may be preset to be red (R) in grayscale of 240, green (G) in grayscale of 240, and blue (B) in grayscale of 240. Further, the brightness generated by the first pixels 101' in the first region 12 of the first display area 10 or by the second pixels 201' in the first region 22 of the second display area 20 may be enhanced to be red (R) in grayscale of 255, green (G) in grayscale of 255, and blue (B) in grayscale of 255, and the brightness generated by the first pixels 101' in the second region 14 of the first display area 10 or by the second pixels 201' in the second region 24 of the second display area 20 may be slightly enhanced to be red (R) in grayscale of 250, green (G) in grayscale of 250, and blue (B) in grayscale of 250. However, the foregoing descriptions are merely exemplary, and the present invention is not limited herein.

Further, according to other embodiments of the present invention, the first image adjustment area 16 and/or the second image adjustment area 26 may be further divided into a plurality of regions, such as a first region, a second region, a third region, or a fourth region, and different adjustments can be performed on the respective regions according to demands.

Further, according to an embodiment of the present invention, the width of the first region 12 or 22 may be enabled to be greater than the width of the second region 14 or 24 in the direction d2 perpendicular to the extending direction d1 of the first frame 110.

Figure 13:
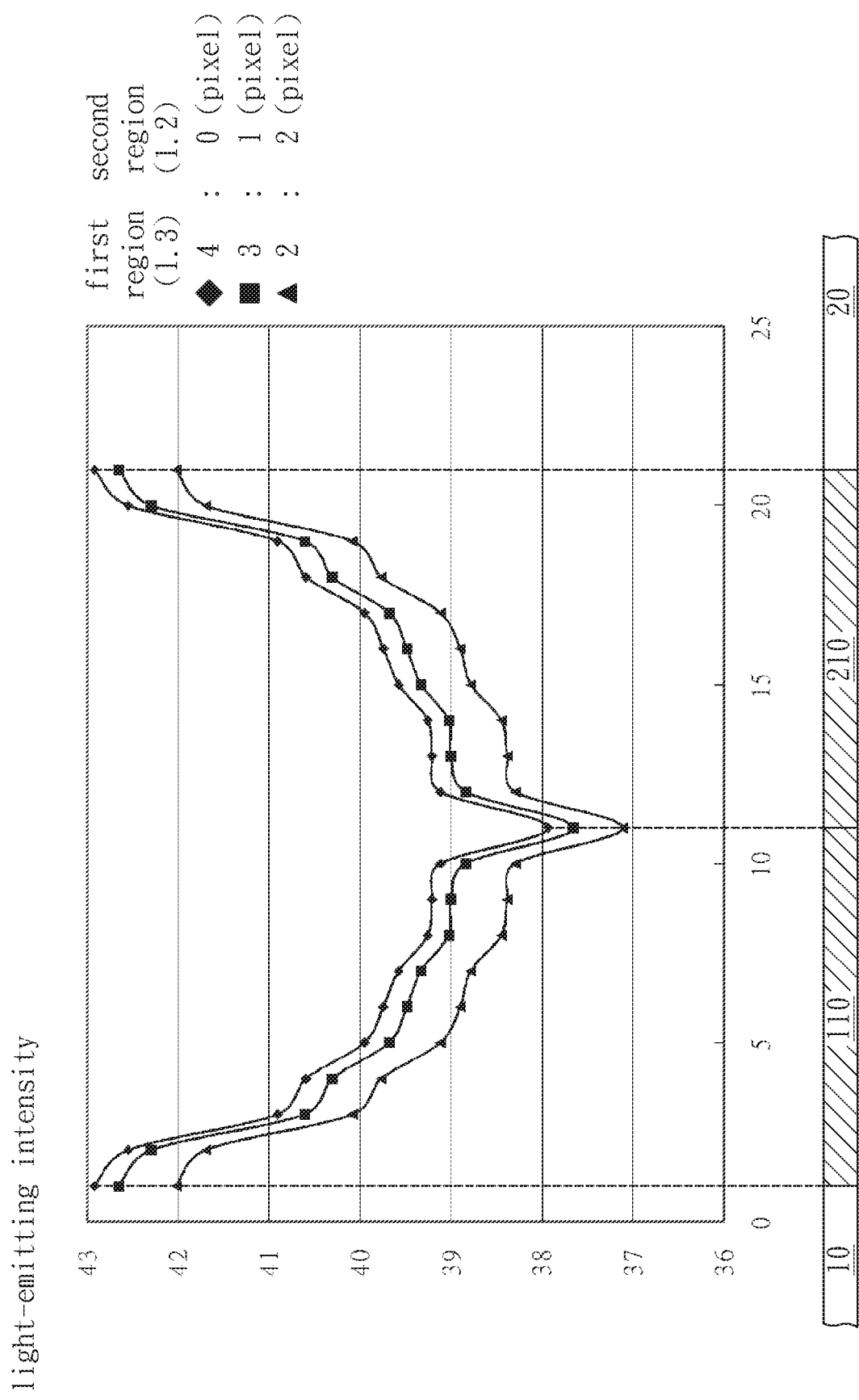
FIG. 13 is a schematic diagram for illustrating light emitting intensities relative to the corresponding width ratio of a first region and a second region in a first image adjustment area and/or a second image adjustment area according to still another embodiment of the present invention.

For example, referring to FIG. 13 showing an exemplary implementation of whole light-emitting intensity of the lens on the black edge area (for example, the first frame 110 and the second frame 210), the light-emitting performances in the case that width ratios of the first region and the second region are different will be described. In FIG. 13, the light-emitting intensity of the first regions 12 and 22 is 1.3 times as described above, and the light-emitting intensity of the second regions 14 and 24 is 1.2 times as described above. According to the width ratio of the first region to the second region, for example, 4 pixels:0 pixel, 3 pixels:1 pixel, and 2 pixels:2 pixels, there may be different total light-emitting intensity on the black edge area. Therefore, with reference to the results shown in FIG. 13, to enable the supplementary light-emitting intensity for the lenses on the black edge area corresponding to the first frame 110 and the second frame 210 to be as large as possible and to correspondingly reduce the intensity of side exit light, preferably, the width of the first region 12 or 22 is a width of three pixels, and the width of the second region 14 or 24 is a width of one pixel. In this way, excessively strong side exit light can be alleviated or avoided, while the whole light-emitting intensity is slightly reduced. However, the foregoing descriptions are merely exemplary, with reference to the foregoing descriptions, persons of ordinary skill in the art may freely adjust the light-emitting intensity and the widths of the first region 12 or 22 and/or the second region 14 or 24 with respect to the respective elements based on the demands and expected performances, and the present invention is not limited to the specific examples shown herein.

Therefore, according to the embodiments of the present invention described above, a display device whose black edges or black lines at edges or an assembling boundary are blurred, and the display quality of image over the edges or the assembling boundary of the display device may also be further improved. Therefore, the obtrusive appearance and cutting appearance at edges or assembling boundaries of a single display device or assembled display devices can be alleviated or eliminated, and the consistence and coordination of images of the display device can be improved, thereby improving the display quality of the display device.

The foregoing descriptions are merely some preferable embodiments of the present invention. It should be noted that all variants and modifications may be made to the present invention without departing from the spirit and principles of the present invention. It should be known that all possible variants including replacement, combination, modification, and substitutions made in consistence with the intention of the present invention and within the scope defined by the appended claims of the present invention should not go beyond the protection scope of the appended claims of the present invention.

REFERENCE NUMERALS

10: First display area
12: First region
14: Second region
15, 15': Lens layer
16: First image adjustment area
18: First image default area
20: Second display area
22: First region
24: Second region
26: Second image adjustment area
28: Second image default area
50: Backlight module
100: First display panel
101, 101': First pixel
110: First frame
150: Substrate
150-1: First layer
150-2: Second layer
150-3: Third layer
151, 152, 153, 154: Lens
200: Second display panel
201, 201': Second pixel
210: Second frame
1000, 2000, 3000, 4000: Display device
S1: First image source signal
S2: Second image source signal
d1, d2: Direction
B, C: Part
P: Lens width
TP: Pixel width
$B_1, B_2$: Frame width
r1, R2: Curvature radius
a1, a2: Light
A1, A2, D1, D2: Light receiving range
$\theta, \theta_1, \theta_2, \theta_3, \theta_4, \theta_B$: Angle
$\theta v_0, \theta v_1, \theta v_2, \theta v_3$: Visual angle
S, L1, L2, L3: Thickness
G1, G2, G3: Light
X, Y1, Y1', Y2, Y2': Position
n1, n2, n3, n4, n5: Refractive index

What is claimed is:

1. A display device, comprising:
a first display panel, having a first display area and a first frame located at a side of the first display area, wherein the first display area comprises a plurality of first pixels, and some of the first pixels form a first image adjustment area adjacent to the first frame; when the first image adjustment area receives a same first image source signal provided to the first display panel, brightness generated by the first pixels in the first image adjustment area is greater than that of the other first pixels in the first display area; and
a lens layer, covering the first image adjustment area and the first frame, wherein
the lens layer comprises a plurality of lenses arranged side by side, and the plurality of lenses respectively extend along an extending direction of the first frame,
wherein the plurality of lenses and the plurality of first pixels respectively have a lens width and a first pixel width in a direction perpendicular to the extending direction of the first frame, and the lens width is less than the first pixel width.

2. The display device according to claim 1, further comprising:
a second display panel adjacent to the first display panel, having a second display area and a second frame located at a side of the second display area, wherein the second frame and the first frame are arranged side by side; the second display area comprises a plurality of second pixels, and some of the second pixels form a second image adjustment area adjacent to the second frame; when the second image adjustment area receives a same second image source signal provided to the second display panel, brightness generated by the second pixels in the second image adjustment area is greater than that of the other second pixels in the second display area, wherein
the lens layer covers the second frame and the second image adjustment area.

3. The display device according to claim 2, wherein the lens layer further comprises at least one layer, and the lens and the at least one layer satisfy the following equation:

$$\sum_{n=1}^{x} L_n \tan\theta_n - \frac{P}{2} \geq B_1,$$

wherein, $L_n$: a thickness of an $n^{th}$ layer of the at least one layer of the lens layer;
$\theta_n$: a refraction angle of the light incident on and entering the $n^{th}$ layer of the at least one layer of the lens layer while the light is emitted from an edge of the lens in a direction perpendicular to the at least one layer along a cross section taken in a direction perpendicular to the extending direction of the first frame;
P: the lens width along the cross section taken in the direction perpendicular to the extending direction of the first frame;
$B_1$: a width of the first frame along the cross section taken in the direction perpendicular to the extending direction of the first frame.

4. The display device according to claim 2, wherein the lens layer further comprises at least one layer, and the lens and the at least one layer satisfy the following equation:

$$\sum_{n=1}^{x} L_n \tan\theta_n - \frac{P}{2} \geq B_1 + B_2$$

wherein, $L_n$: a thickness of an $n^{th}$ layer of the at least one layer of the lens layer;
$\theta_n$: a refraction angle of the light incident on and entering the $n^{th}$ layer of the at least one layer of the lens layer while the light is emitted from an edge of the lens in a direction perpendicular to the at least one layer along a cross section taken in a direction perpendicular to the extending direction of the first frame;
P: the lens width along the cross section taken in the direction perpendicular to the extending direction of the first frame;
$B_1$: a width of the first frame along the cross section taken in the direction perpendicular to the extending direction of the first frame; and
$B_2$: a width of the second frame along the cross section taken in the direction perpendicular to the extending direction of the first frame.

5. The display device according to claim 1, wherein the lens width is not greater than ⅕ of the first pixel width.

6. The display device according to claim 5, wherein the lens width ranges from ⅕ to ⅙ of the first pixel width.

7. The display device according to claim 1, further comprising a backlight module disposed on the first display panel at a side opposite to the lens layer, wherein the backlight module generates backlight incident onto the first display panel, the backlight has an intensity-visual angle distribution curve using a normal direction (0°) as an average, and a standard deviation of the intensity-visual angle distribution curve is greater than 20°.

8. The display device according to claim 7, wherein the standard deviation of the intensity-visual angle distribution curve is greater than 25°.

9. The display device according to claim 1, wherein for the same first image source signal, the brightness generated by the first pixels in the first image adjustment area is greater than 1.2 times of that of the other first pixels in the first display area.

10. The display device according to claim 1, wherein the first image adjustment area comprises a first region and a second region respectively extending along the first frame, the first region and the second region are arranged side by side, and the first region is closer to the first frame; and the brightness generated by the first pixels in the first region and the second region is greater than that of the other first pixels in the first display area, and the brightness generated by the first pixels in the first region is greater than that generated by the first pixels in the second region.

11. The display device according to claim 10, wherein the brightness generated by the first pixels in the first region is greater than 1.3 times of that of the other first pixels in the first display area outside the first image adjustment area.

12. The display device according to claim 10, wherein a width of the first region is greater than that of the second region in a direction perpendicular to the extending direction of the first frame.

* * * * *